(12) United States Patent
Takahashi

(10) Patent No.: US 8,319,522 B2
(45) Date of Patent: Nov. 27, 2012

(54) DATA TRANSFER CIRCUIT, SOLID-STATE IMAGING DEVICE AND CAMERA SYSTEM

(75) Inventor: Tomohiro Takahashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 265 days.

(21) Appl. No.: 12/684,452

(22) Filed: Jan. 8, 2010

(65) Prior Publication Data

US 2010/0182448 A1 Jul. 22, 2010

(30) Foreign Application Priority Data

Jan. 16, 2009 (JP) .................................. 2009-008254

(51) Int. Cl.
*H03K 19/0175* (2006.01)
*H04N 3/14* (2006.01)
*H04N 5/335* (2011.01)
(52) U.S. Cl. .............. 326/82; 326/80; 326/81; 348/294; 348/296; 348/300; 348/301; 348/302
(58) Field of Classification Search .............. 326/37–50, 326/80–92; 348/207.99, 222.1, 229.1–230.1, 348/241–251, 255, 266, 272–283, 294–324, 348/332
See application file for complete search history.

(56) References Cited

U.S. PATENT DOCUMENTS

| 2004/0080637 A1* | 4/2004 | Nakamura et al. ............ 348/255 |
| 2005/0168603 A1* | 8/2005 | Hiyama et al. ................ 348/294 |
| 2006/0001918 A1* | 1/2006 | Okano et al. .................. 358/482 |
| 2008/0055446 A1* | 3/2008 | Hunter et al. ................. 348/308 |
| 2008/0158397 A1* | 7/2008 | Hayakawa .................... 348/274 |
| 2008/0284886 A1* | 11/2008 | Wakabayashi et al. ....... 348/301 |
| 2008/0303931 A1* | 12/2008 | Taguchi et al. ............... 348/308 |
| 2008/0309809 A1* | 12/2008 | Cieslinski .................... 348/308 |
| 2010/0007775 A1* | 1/2010 | Wang et al. ................... 348/241 |

FOREIGN PATENT DOCUMENTS

| JP | HEI 10-070687 A | 3/1998 |
| JP | HEI 10-289585 A | 10/1998 |
| JP | 2000-306383 A | 11/2000 |
| JP | 2005-323331 | 11/2005 |
| JP | 2008-288953 A | 11/2008 |
| JP | 2008-306695 A | 12/2008 |

OTHER PUBLICATIONS

Japanese Patent Office, Office Action issued in Patent Application JP 2009-008254, on Dec. 21, 2010.

* cited by examiner

*Primary Examiner* — Jason Chan
*Assistant Examiner* — Michael Osinski
(74) *Attorney, Agent, or Firm* — SNR Denton US LLP

(57) ABSTRACT

A data transfer circuit includes: plural transfer lines transferring data; plural data output units connected to end portions of the respective transfer lines, detecting and outputting data transferred through the transfer lines with drive performance in accordance with a control signal; plural data transmission units arranged in parallel, transferring data to the corresponding transfer lines in response to selection signals; a selection control unit generating selection signals and outputting the selection signals to the corresponding data transmission units; and a control unit generating the control signal for controlling drive performance of the data output units to adjust data transfer delay and outputting the control signal to the respective output units. The transfer lines are arranged in the arrangement direction of the data transmission units and connected to the corresponding data output units. The control unit generates the control signal in accordance with the length of the data transfer distance.

5 Claims, 13 Drawing Sheets

NORMAL CIRCUIT

PRESENT CIRCUIT

COMPARISON BETWEEN TRANSMISSION WAVEFORMS AND DELAYS

DATA TRANSFER CIRCUIT, SOLID-STATE IMAGING DEVICE AND CAMERA SYSTEM

BACKGROUND OF THE INVENTION

1. Field of the Invention

The present invention relates to a data transfer circuit, a solid-state imaging device represented by a CMOS image sensor and a camera system including plural data from which transfer data can be selected on a bus and having a function of receiving transferred data at a bus end.

2. Description of the Related Art

A data bus system including plural data from which transfer data can be selected on a bus and reading the transferred data by a sense amplifier circuit arranged at a bus end is used as a data transfer circuit for a memory and the like.

Generally, in this type of data transfer circuit, there exist a case of reading data close to the sense amplifier circuit and a case of reading data far from the sense amplifier circuit, and the distance through which data is transferred differs according to data to be selected.

This type of data transfer circuit is applied to a CMOS image sensor as a solid-state imaging device (image sensor) and the like.

A CMOS image sensor can use the same manufacturing process as a common CMOS-type integrated circuit in manufacturing the sensor. In addition, the sensor can be driven by a single power supply, and the sensor can include an analog circuit and a logic circuit using the CMOS process in a same chip.

Therefore, the CMOS image sensor has plural significant advantages such that the number of peripheral ICs can be reduced.

As an output circuit of a CCD, one-channel (ch) output using a FD amplifier including a floating diffusion (FD) layer is the mainstream.

On the other hand, the CMOS image sensor has FD amplifiers with respect to respective pixels, and column-parallel output is the mainstream, in which a certain row in a pixel array is selected and data of the row is read in a column direction at a time.

This is because it is difficult to obtain sufficient drive performance by the FD amplifiers arranged in pixels, thus, it is necessary to reduce the data rate, therefore, parallel processing is advantageous.

Various signal output circuits for the column-parallel output type CMOS image sensor are actually proposed.

As one of advanced forms of the circuit, there exists a circuit including an analog-digital converter (hereinafter, abbreviated as ADC) with respect to each column to take pixel signals as digital signals.

The CMOS image sensor including column-parallel type ADCs as described above is disclosed in, for example, "An Integrated 800×600 CMOS Image System" ISSCC Digest of Technical Papers, pp. 304-305, February, 1999 written by W. Yang et. Al., (Non-Patent Document 1) and JP-A-2005-323331 (Patent Document 1).

As described above, the column-parallel reading system may be applied to the solid-state imaging device (CMOS image sensor).

Therefore, in the CMOS image sensor, scanning in the row direction (vertical scanning) is performed at extremely low speed, whereas scanning in the column direction (horizontal scanning) will be performed at extremely high speed because all data of one row should be read out during a period of 1 H (horizontal scanning).

SUMMARY OF THE INVENTION

As described above, in the data transfer in which transferred data is read by the sense amplifier circuit at the bus end, there exist a case in which data close to the sense amplifier circuit is read and a case in which data far from the sense amplifier circuit is read, and the distance through which data is transferred differs according to data to be selected.

Since the distance through which a signal propagates along wiring differs in the case of reading data close to the arrangement position of the sense amplifier circuit and in the case of reading data far from the sense amplifier circuit, there is a problem that transfer speed (transfer delay) differs a lot due to difference of effects of parasitic resistance and capacitance of wiring.

In addition, the configuration of the sense amplifier is fixed, therefore, it is necessary to design the circuit so as to read both data at a near position and data at a far position, and there are limitations in the number of data to be propagated on a data transfer line and data transfer speed.

For example, in the CMOS image sensor of the column-parallel type AD system, AD converted data of full amplitude is converted into a minute differential signal to be transmitted through a data transfer line bus, then, restored to the signal of full amplitude again by the sense amplifier circuit.

At this time, there exist data in columns close to the sense amplifier circuit and data in columns far from the sense amplifier circuit, and the transfer distance differs according to the column position.

As described above, since the configuration of the sense amplifier circuit is basically fixed, the reading delay has the wide range according to the transfer distance. Therefore, there was also a problem that it is difficult to secure latch timing of a flip flop which takes data in a stage subsequent to the sense amplifier circuit.

In recent years, the image sensor is becoming large in size as a market of a single lens reflex camera is enlarged, and effects due to wiring delay hinders the column (horizontal) scanning of the image sensor from being speeded up.

Thus, it is desirable to provide a data transfer circuit, a solid-state imaging device and a camera system capable of reducing effects due to wiring delay on transfer lines to data output units, capable of taking data in the data output units precisely as well as accurately, and further capable of speeding up the scanning.

According to an embodiment of the invention, there is provided a data transfer circuit including a plural transfer lines transferring data, plural data output units connected to end portions of the respective transfer lines, detecting and outputting data transferred through the transfer lines with drive performance in accordance with a control signal, plural data transmission units arranged in parallel, transferring data to the corresponding transfer lines in response to selection signals, a selection control unit generating selection signals and outputting the selection signals to the corresponding data transmission units and a control unit generating the control signal for controlling drive performance of the data output units to adjust data transfer delay and outputting the control signal to the respective data output units, in which the transfer lines are arranged in the arrangement direction parallel to the data transmission units and connected to the corresponding data output units arranged in the direction, and the control unit generates the control signal for adjusting the drive performance in accordance with the length of the data transfer distance from the data output units on the transfer lines.

According to another embodiment of the invention, there is provided a solid-state imaging device including a pixel unit in which plural pixels performing photoelectric conversion are arranged in a matrix state, plural transfer lines transferring data, plural data output units connected to end portions of the respective transfer lines, detecting and outputting data transferred through the transfer lines by driving performance in accordance with a control signal, plural holding units arranged in parallel, holding data read from the pixel unit and transferring the data to the corresponding transfer lines in response to selection signals, a scanning unit generating the selection signals and outputting the selection signals to the corresponding holding units, and a control unit generating a control signal for controlling drive performance of the data output units to adjust data transfer delay and outputting the control signal to the respective data output units, in which the transfer lines are arranged in the arrangement direction parallel to the holding units and connected to the corresponding data output units arranged in the direction, and the control unit generates the control signal for adjusting the drive performance in accordance with the length of the data transfer distance from the data output units on the transfer lines.

According to further another embodiment of the invention, there is provided a camera system including a solid-state imaging device, an optical system recording a subject image in a solid-state imaging device and a signal processing circuit processing an output image signal from the solid-state imaging device, in which the solid-state imaging device includes a pixel unit in which plural pixels performing photoelectric conversion are arranged in a matrix state, plural transfer lines transferring data, plural data output units connected to end portions of the respective transfer lines, detecting and outputting data transferred through the transfer lines by driving performance in accordance with a control signal, plural holding units arranged in parallel, holding data read from the pixel unit and transferring the data to the corresponding transfer lines in response to selection signals, a scanning unit generating the selection signals and outputting the selection signals to the corresponding holding units, and a control unit generating a control signal for controlling drive performance of the data output units to adjust data transfer delay and outputting the control signal to the respective data output units, the transfer lines are arranged in the arrangement direction parallel to the holding units and connected to the corresponding data output units arranged in the direction, and the control unit generates the control signal for adjusting the drive performance in accordance with the length of the data transfer distance from the data output units on the transfer lines.

According to the embodiments of the invention, selection signals are generated in the scanning unit and outputted to corresponding holding units. Accordingly, data is outputted from the holding units to corresponding transfer lines, then, transferred to the data output units.

In the data output units, data transferred through the transfer lines is detected and outputted with drive performance in accordance with a control signal by the control unit.

According to the embodiments of the invention, effects due to wiring delay on the transfer lines to the data output units can be reduced. Therefore, it is possible to take data in the data output units precisely as well as accurately.

DESCRIPTION OF THE PREFERRED EMBODIMENTS

Figure 1:
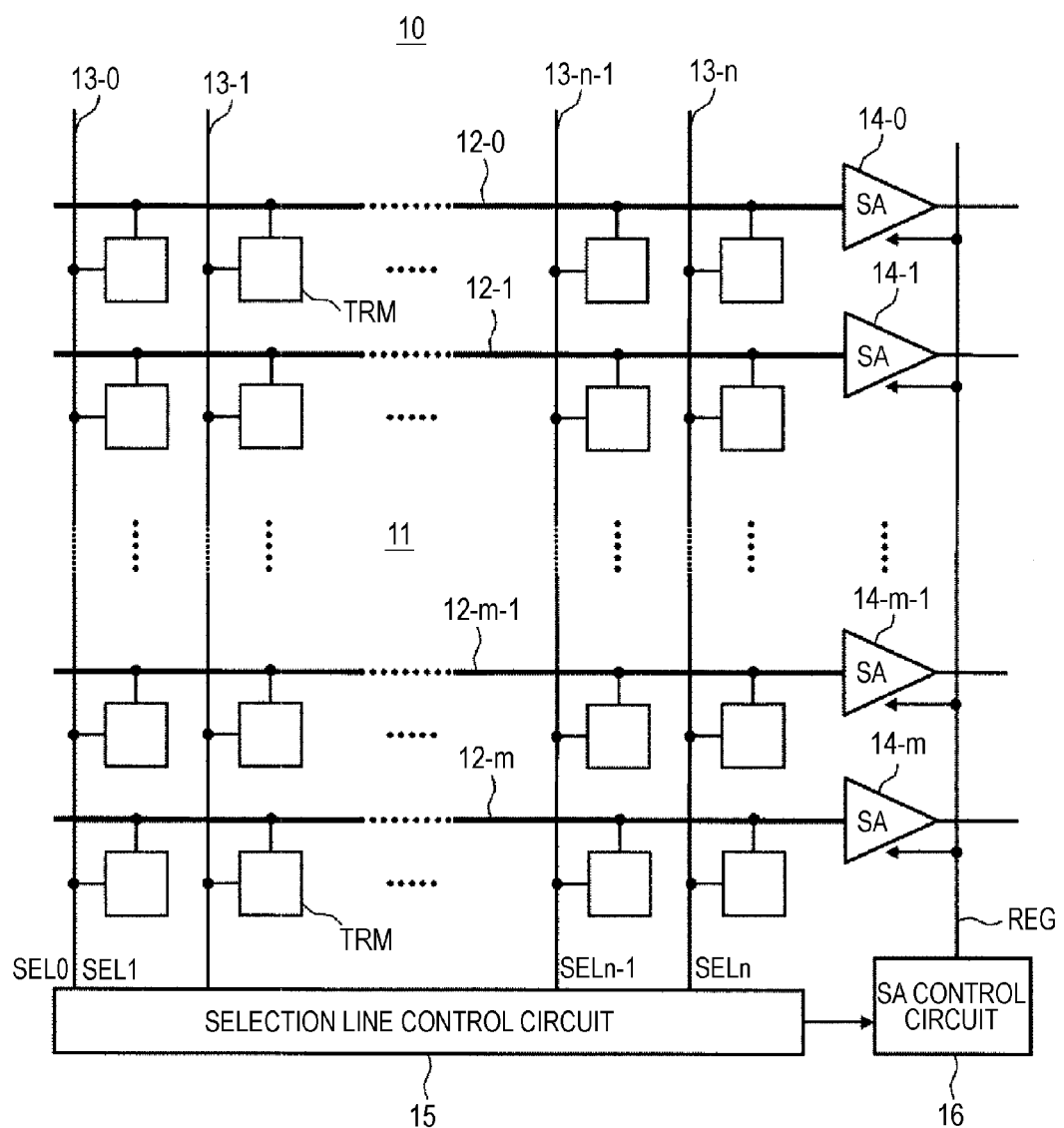
FIG. 1 is a diagram showing a configuration example of a data transfer circuit according to a first embodiment of the embodiment.

Hereinafter, embodiments of the invention will be explained with reference to the drawing.

The explanation will be made in the following order.
1. First Embodiment (Basic configuration example of a data transfer circuit)
2. Second Embodiment (Application example to a column-parallel ADC mounted solid-state imaging device in the data transfer circuit)
3. Third Embodiment (Configuration example of a camera system)

1. First Embodiment

FIG. 1 is a diagram showing a configuration example of a data transfer circuit according to a first embodiment of the invention.

A data transfer circuit 10 includes a transmission unit array 11, plural data transfer lines 12-0 to 12-*m*, plural selection lines 13-0 to 13-n, plural sense amplifier circuits (SA) 14-0 to 14-m, a selection line control circuit 15 and a sense amplifier (SA) control circuit 16.

Sense amplifier circuits 14-0 to 14-m form data output units, the selection line control circuit 15 forms a selection control unit and the sense amplifier control circuit 16 forms a control unit.

The transmission unit array 11 includes plural data transmission units TRM arranged in a matrix state of (m+1)×(n+1).

In the transmission unit array 11, the data transfer lines 12-0 to 12-m are arranged correspond to respective rows of matrix arrangement of the data transmission units TRM, and the selection lines 13-0 to 13-n are arranged so as to be orthogonal to the data transfer lines 12-0 to 12-m, corresponding to respective columns of matrix arrangement.

The data transmission units TRM arranged in the same row are connected in common to each of the data transfer lines 12-0 to 12-m arranged at corresponding rows, and the data transmission units TRM arranged in the same column are connected to each of the selection line 13-0 to 13-n arranged at corresponding columns.

End portions at respective data transfer lines 12-0 to 12-m are connected to input portions of corresponding sense amplifier circuits 14-0 to 14-m as the data output units.

Respective data transfer lines 12-0 to 12-m are arranged in parallel to the arrangement direction of the data transmission units TRM, which are connected to the input portions of corresponding sense amplifier circuits 14-0 to 14-m arranged in this direction.

End portions of the selection lines 13-0 to 13-n are connected to the selection line control circuit 15.

Respective data transmission units TRM transfer data to corresponding data transfer lines 12-0 to 12-m in response to selection signals.

The selection line control circuit 15 generates selection signals SEL0 to SELn, outputting them to corresponding selection lines 13-0 to 13-n.

The sense amplifier circuits 14-0 to 14-m are connected to end portions of respective data transfer lines 12-0 to 12-m at respective input portions thereof as described above.

The sense amplifier circuits 14-0 to 14-m have a function of detecting and outputting data transferred through the data transfer lines 12-0 to 12-m with drive performance corresponding to a control signal REG from the sense amplifier control circuit 16.

The sense amplifier control circuit 16 generates the control signal REG for controlling drive performance of the sense amplifier circuits 14-0 to 14-m to adjust data transfer delay and outputs the signal to respective sense amplifier circuits 14-0 to 14-m.

The sense amplifier control circuit 16 has a function of generating the control signal REG for adjusting drive performance according to the length of a data transfer distance on the data transfer lines 12-0 to 12-m based on the arrangement position of the sense amplifier circuits 14-0 to 14-m.

In this case, the sense amplifier control circuit 16 generates the control signal REG so that drive performance is increased in proportion as the data transfer distance on the data transfer lines 12-0 to 12-m becomes long, for example, based on the arrangement position of the sense amplifier circuits 14-0 to 14-m.

For example, the sense amplifier control circuit 16 acquires information of the length of the data transfer distance from the selection line control circuit 15.

It is possible to adjust the drive performance of respective sense amplifier circuits 14-0 to 14-m in accordance with the control signal REG, and a specific configuration example will be described later.

Each of sense amplifier circuits 14-0 to 14-m basically includes an amplification unit for amplifying input data transferred through the data transfer lines 12-0 to 12-m and a feedback unit for feeding back data amplified at the amplification unit to the data transmission lines 12-0 to 12-m.

The feedback unit has a function of feeding back amplified data to the data transfer lines 12-0 to 12-m by the feedback amount in accordance with the control signal REG.

The data transfer circuit 10 having the above configuration is formed as a data bus system including the sense amplifier circuits (SA) 14-0 to 14-m drive performance of which can be adjusted based on information of the length of the data transfer distance on the data transfer lines 12-0 to 12-m.

The plural data transmission units TRM are connected to the data transmission lines 12-0 to 12-m. Which data will be transferred is controlled by selection signals SEL0 to SELn of the selection lines 13-0 to 13-n to which respective data transmission units TRM are connected.

Data transferred through the data transfer lines 12-0 to 12-m is read by the sense amplifier circuits 14-0 to 14-m.

The drive performance of the sense amplifier circuits 14-0 to 14-m is controlled by the control signal REG from the sense amplifier control circuit 16 according to the length of the data transfer distance.

For example, the sense amplifier control circuit 16 acquires information of the length of the data transfer distance from the selection line control circuit 15.

However, when the configuration of the data bus or the order of controlling selection lines are previously recognized, information of the length of the transfer distance can be included in the sense amplifier control circuit 16 directly, and it is not indispensable that information is acquired from the selection line control circuit 15.

Additionally, the parallelism of the data transfer lines 12-0 to 12-m and the number of data transmission units TRM connected to each of data transfer lines 12-0 to 12-m are optional.

Figure 2:
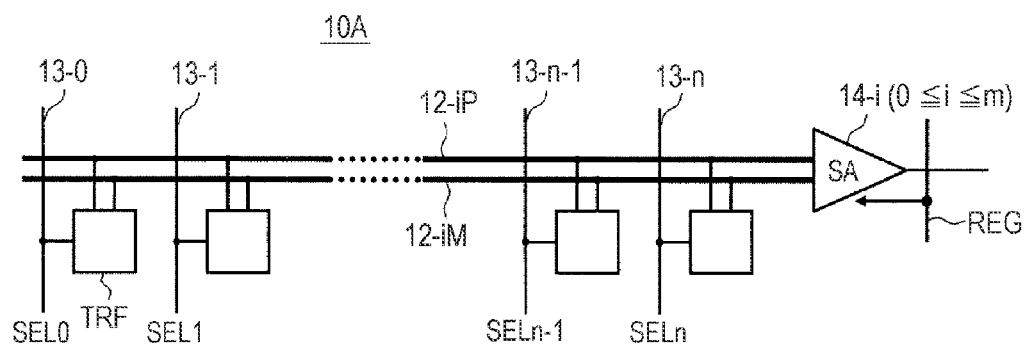
FIG. 2 is a diagram for explaining that the data transfer circuit according to the first embodiment can be applied to a differential transfer system.

Though each of the data transfer lines 12-0 to 12-m is configured by a single line in FIG. 1, for example, a differential transmission system using a two-line data bus with respect to one data as shown in FIG. 2 can be applied.

In the example of FIG. 2, only part of a data transfer circuit 10A is shown.

In FIG. 2, end portions of two data transfer lines 12-iP, 12-iM are connected to a sense amplifier circuit 14i (0≦i≦m).

Respective data transfer units TRM transfers differential data to the data transfer lines 12-iP, 12-iM in response to selection signals SEL0 to SELn of the selection lines 13-0 to 13-n.

As described above, according to the embodiment of the invention, the input portions of the sense amplifier circuits 14-0 to 14-m are connected to end portions of respective data transfer lines 12-0 to 12-m in the data transfer circuit 10.

The sense amplifier circuits 14-0 to 14-m have a function of detecting and outputting data transferred through the data transfer lines 12-0 to 12-m with drive performance in accordance with the control signal REG from the sense amplifier control circuit 16.

The sense amplifier control circuit 16 the control signal REG for adjusting drive performance of the sense amplifier circuits 14-0 to 14-m according to the length of the data transfer distance on the data transfer lines 12-0 to 12-m based on the arrangement position of the sense amplifier circuits 14-0 to 14-m.

Therefore, the following advantages can be obtained according to the first embodiment of the invention.

Specifically, it is possible to speed up data transfer from a far end as well as to respond to long wiring. This is advantageous for data transfer having the long H-size such as a large CMOS image sensor of the full size or an APS size.

That is, at the time of horizontal transfer of data at the imaging unit, a position-depending component due to the data transfer distance in skew components of data which have been obstacles for speeding up can be removed, which will contribute further speeding-up or enlargement to the image sensor.

Data transfer delay from the near end and far end can be made aligned, therefore, design for timing margin will be easy at a flip flop for taking data in a stage subsequent to the sense amplifier circuit, which can realize reduction of a design period and the number of processes.

The image sensor has a narrow and uniform column width and a repeater circuit inserted in the middle of wiring is irregular, therefore, it is possible to speedup data transfer without inserting the repeater in the wiring, which will be advantageous in the image sensor.

The data transfer delay from the near end is delayed, thereby reducing power consumption.

Next, a specific configuration example in the case that the data transfer circuit having the above configuration and advantages is applied to the column-parallel ADC mounted solid-state imaging device (CMOS image sensor) will be described in detail as a second embodiment.

2. Second Embodiment

Figure 3:
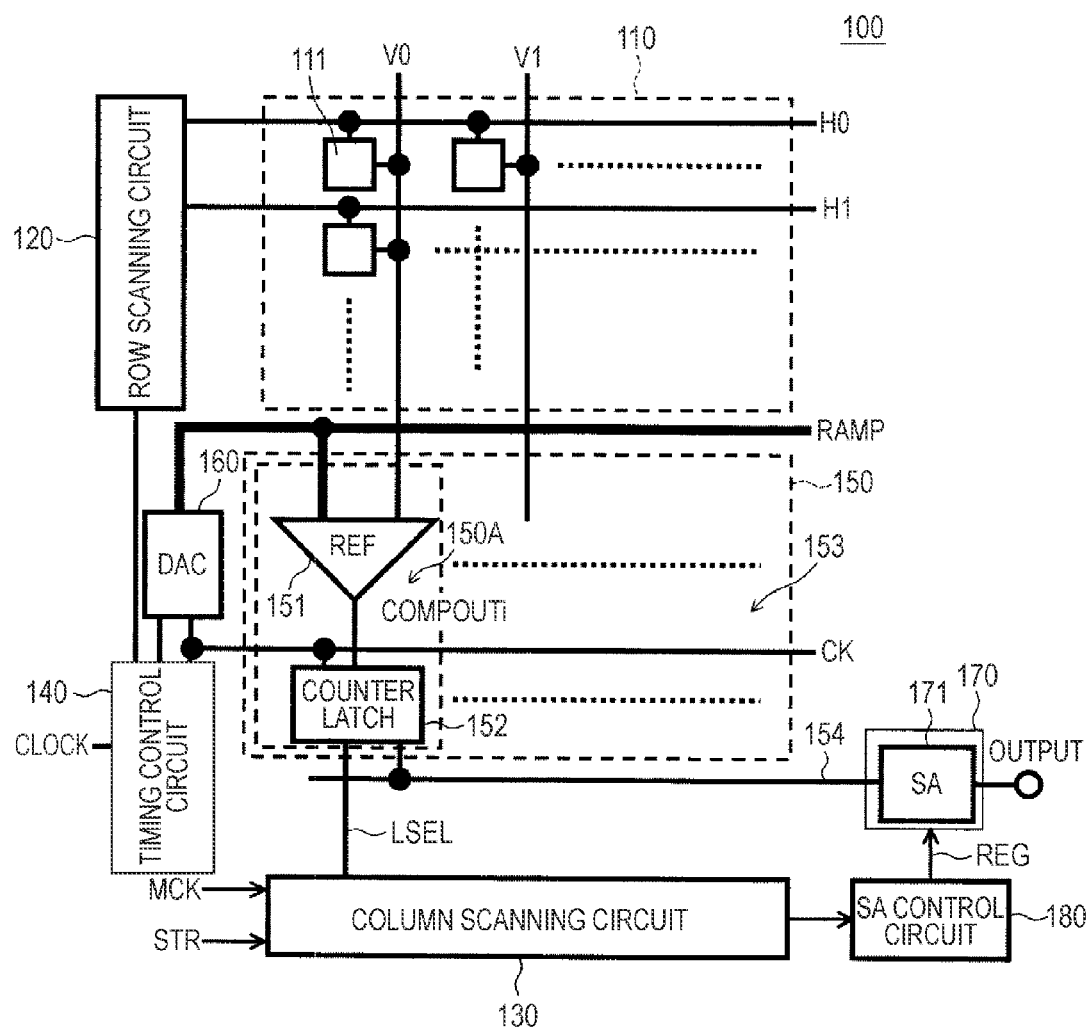
FIG. 3 is a block diagram showing a configuration example of a column-parallel ADC mounted solid-state imaging device (CMOS image sensor) according to an embodiment of the invention.

Entire Configuration Example of a Column-Parallel ADC Mounted Solid-State Imaging Device FIG. 3 is a block diagram showing a configuration example of a column-parallel ADC mounted solid-state imaging device (CMOS image sensor) including a data transfer circuit according to an embodiment of the invention.

Figure 4:
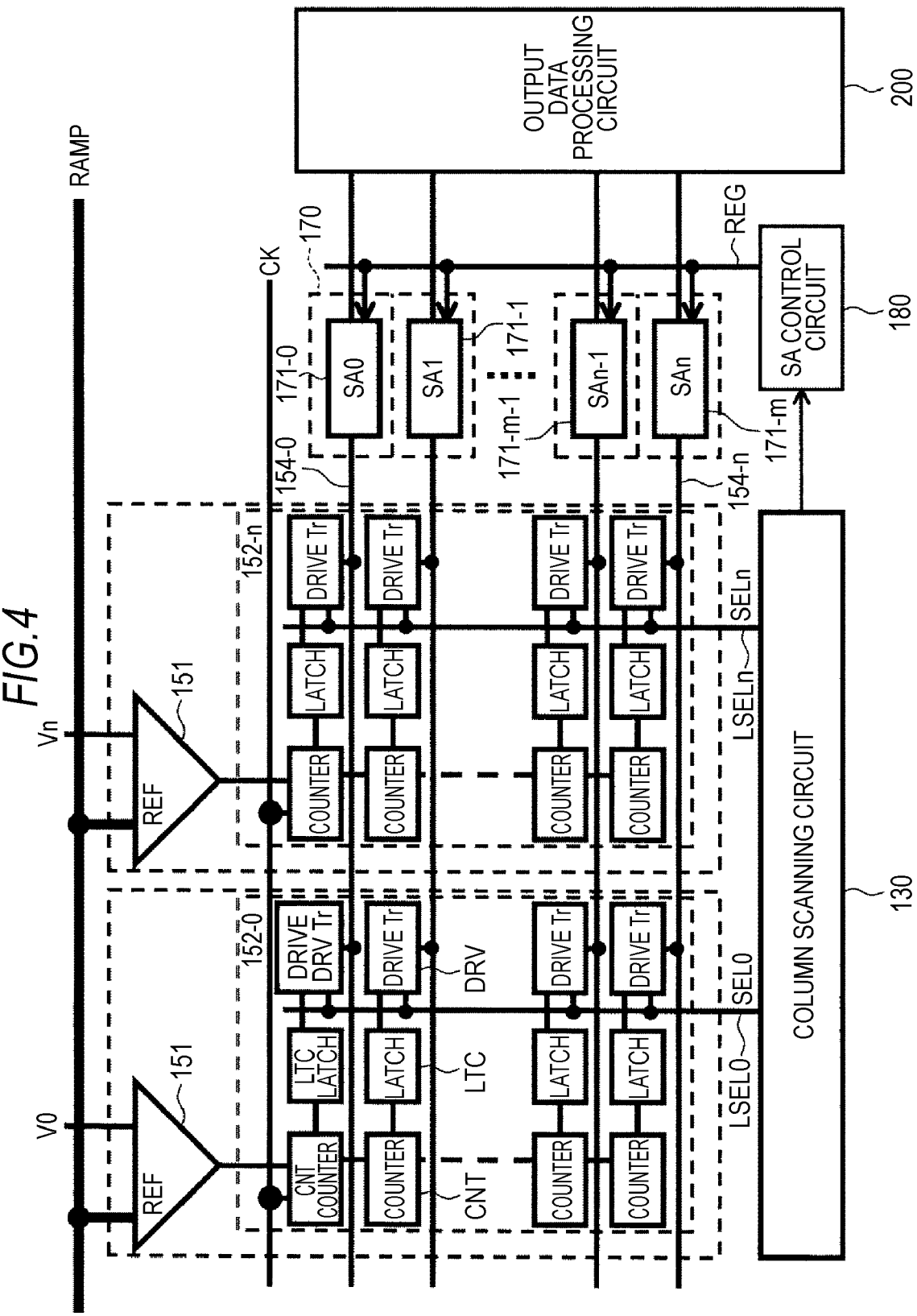
FIG. 4 is a diagram showing a more specific configuration example of a data holding and data transfer system of the solid-state imaging device of FIG. 3.

FIG. 4 is a diagram showing a more specific configuration example of a data holding and data transfer system of a solid-state imaging device of FIG. 3.

Figure 5:
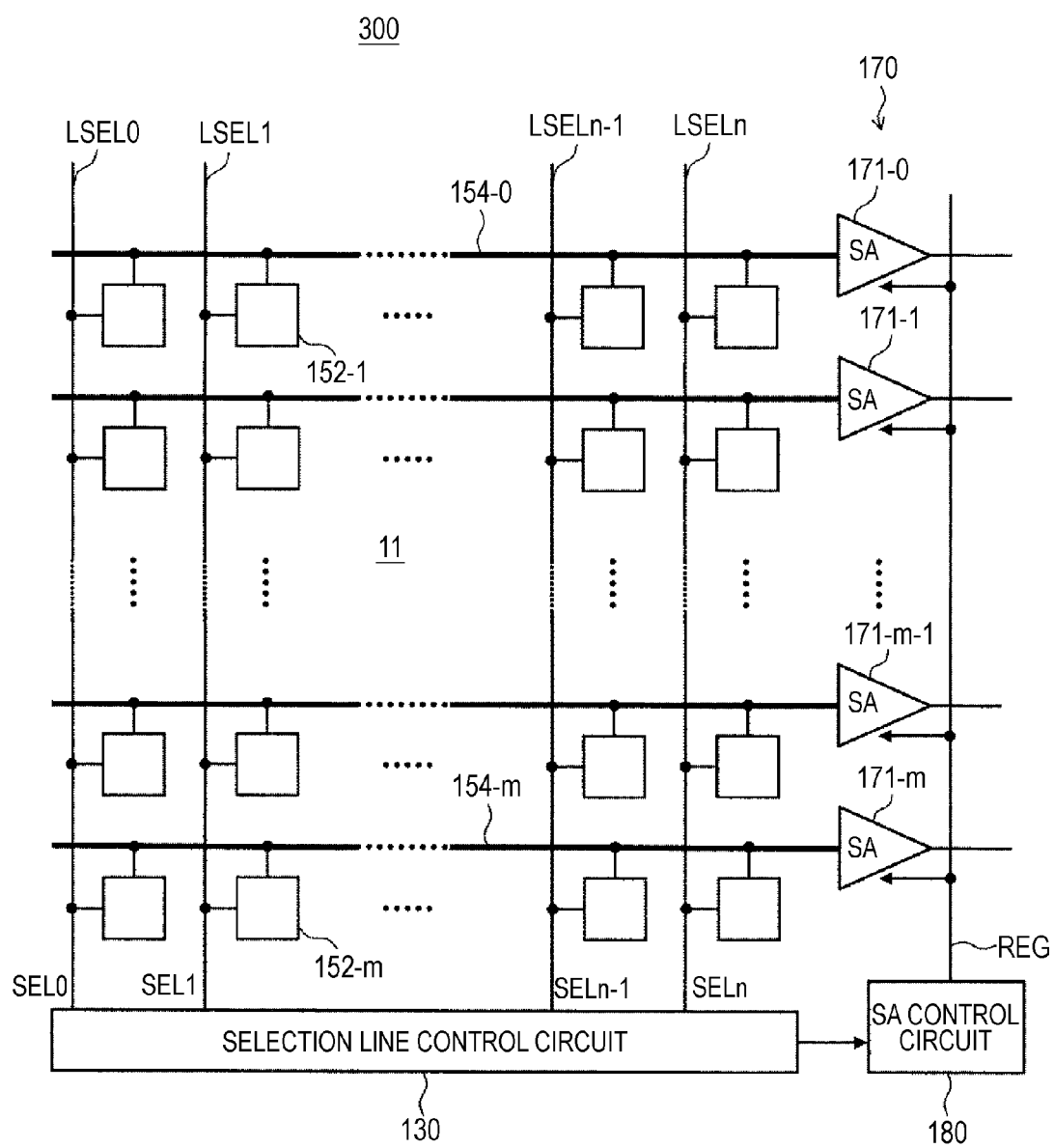
FIG. 5 is a diagram showing an example of the entire configuration of a data transfer system including sense amplifier circuits (SA) having a function capable of adjusting drive performance based on information of the length of the data transfer distance.

FIG. 5 is a diagram showing an example of the entire configuration of a data transfer system including sense amplifier circuits (SA) having the function capable of adjusting drive performance based on information of the length of the data transfer distance.

The data transfer system of FIG. 5 has a configuration basically equal to the data transfer circuit 10 of FIG. 1.

A solid-state imaging device 100 includes a pixel array unit 110 as a pixel unit, a row scanning circuit 120, a column scanning circuit 130 as a scanning unit, a timing control circuit 140, an ADC group 150 and a digital-analog converter (DAC) 160.

The solid-state imaging device 100 further includes data output circuits (data output units) 170 including plural sense amplifiers (SA) circuit 171 and a sense amplifier (SA) control circuit 180 as a control unit.

The column scanning circuit 130 forms a selection control unit. The column scanning circuit 130 also has the same function as the selection line control circuit 15 of the data transfer circuit 10 of FIG. 1.

The solid-state imaging device 100 includes the same function as the data transfer circuit 10 of the first embodiment and also has a function of adjusting drive performance of the sense amplifier circuits according to the length of the data transfer distance from the sense amplifier circuits 171 to adjust (compensate) data transfer speed (delay).

According to the embodiment of the invention, the drive performance of the sense amplifier circuits 171 can be adjusted based on information of the length of the data transfer distance.

The pixel array unit 110 is formed by unit pixels 111 each having a photodiode as a photoelectric conversion element and a pixel amplifier are arranged in a matrix state of M-rows and N-columns.

In the solid-state imaging device 100, a control system for sequentially reading signals of the pixel array unit 110 is arranged.

That is, the solid-state imaging device 100 includes the timing control circuit 140 generating internal clocks, the row scanning circuit 120 controlling row addresses and row scanning and the column scanning circuit 130 controlling column addresses and column scanning.

The ADC group 150 has (n+1) pieces of comparators (REF) 151 arranged so as to correspond to respective columns of the pixel arrangement and plural ADCs 150A each having an asynchronous up/down counter (hereinafter, referred to as a counter latch) connected to an output of each comparator 151.

The comparator 151 compares a ramp waveform RAMP in which reference voltage generated by the DAC 160 is changed in a shape of stairs with an analog signal obtained from the unit pixel 111 in each row lines H0, H1 . . . via column lines V0, V1 . . . .

The counter latch 152 performs up/down counting by receiving output from the comparator 151.

The ADCs 150A each having the comparator 151 and the counter latch 152 are arranged at respective column lines V0, V1 . . . so as to correspond to respective columns of the pixel arrangement, which forms a column-parallel ADC block 153.

An output of each counter latch 152 is connected to a data transfer line 154. To the data transfer line 154, an input of the sense amplifier circuit 171 in the data output circuit 170 is connected.

The counter latch 152 having the function as a holding unit is in a down-counting state at the initial stage. When the counter latch performs reset-counting and an output COMPOUTi of the corresponding comparator 151 is inverted, the counter latch stops down-counting operation and holds a counter value.

At this time, an initial value of the counter latch 152 is determined to be an optional value in gradations of AD conversion, for example, "0". During the reset-counting period, a reset component ΔV of the unit pixel 111 is readout.

The counter latch 152 is allowed to be in an up-counting state after that, counting data corresponding to the incident light amount. When the output COMPOUTi of the corresponding comparator 151 is inverted, the counter latch 152 holds the counter value corresponding to the comparison period.

The counter value held by the counter latch 152 is scanned by the column scanning circuit 130 and transferred to the sense amplifier circuit 171 through the data transfer line 154 as a digital signal.

The column scanning circuit 130 is activated by a start pulse STR or a master clock MCK being supplied.

The column scanning circuit 130 drives a corresponding selection line LSEL in synchronization with a drive clock CLK corresponding to the master clock MCK (based on MCK) to allow latch data of the counter latch 152 to be read to the data transfer line 154.

[First Configuration Example of the Data Transfer System]

Here, a more specific configuration example of the data transfer system in the ADC mounted solid-state imaging device of FIG. 3 will be explained with reference to FIG. 4 and FIG. 5.

Each of counter latches 152-0 to 152-*n* includes a counter CNT, a latch LTC and a drive transistor DRVTr arranged in parallel for one bit (10-bit, 12-bit and so on), for example, as shown in FIG. 4. (n+1) columns of counter latches as the ADCs 150A are arranged in parallel.

At the time of data transfer, particular columns of the counter latches 152-0 to 152-*n* are sequentially selected by the selection signals SEL0 to SELn supplied by the column scanning circuit 130 through the selection lines LSEL0 to LSELn.

In the column scanning circuit 130, a start position is selected by a start pulse, and sequential selection is performed by configuring the column scanning circuit 130 by a shift register and the like.

Information (1 or 0) by the drive transistor DRVTr of the selected columns is read to data transfer lines 154-0 to 154-*m*, detected by the sense amplifier circuit 171-0 to 171-*m* of the sense output circuit 170 and outputted to an output data processing circuit 200.

Figure 6:
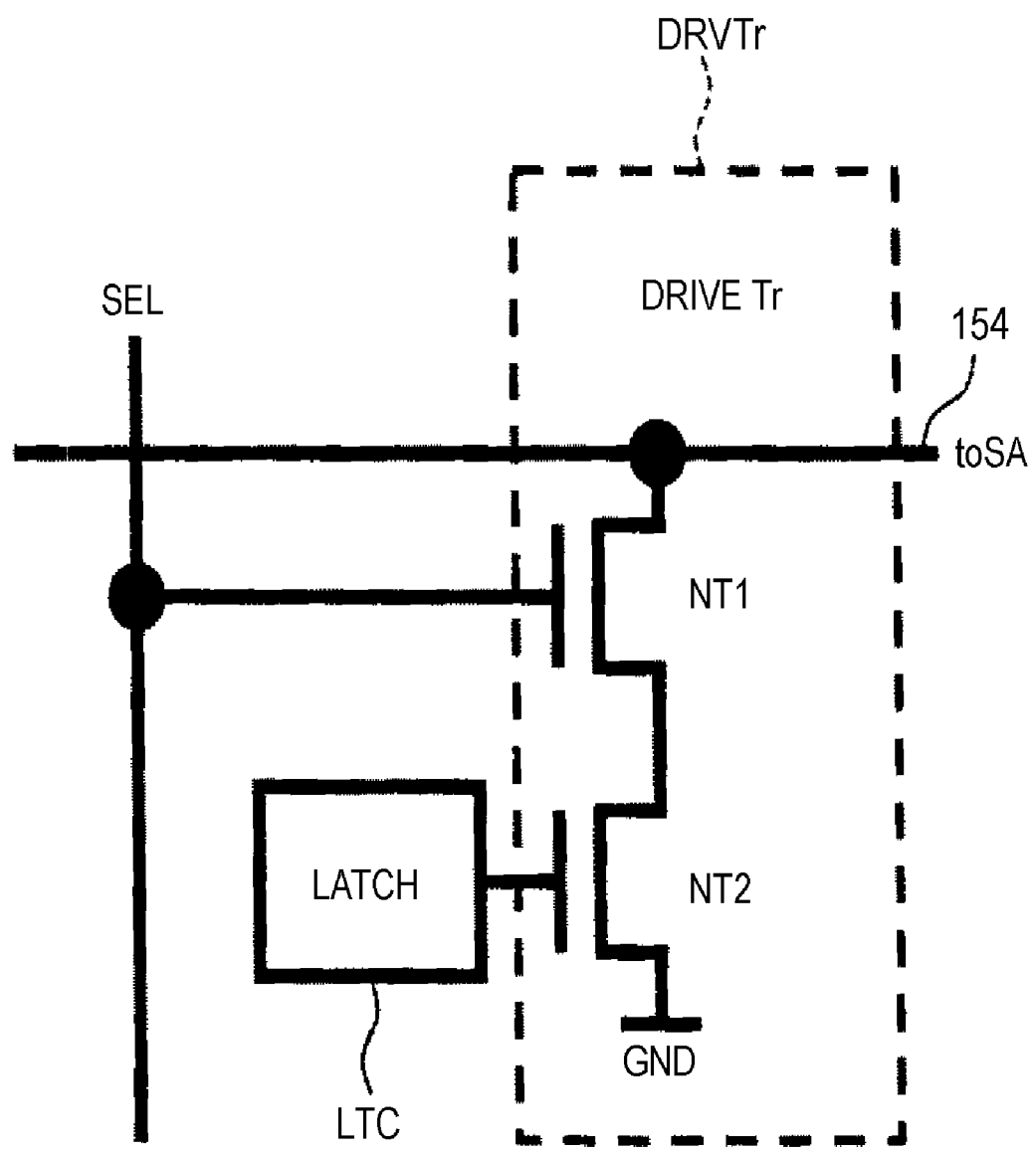
FIG. 6 is a circuit diagram showing a specific example of a drive transistor Tr in a counter latch circuit according to the embodiment.

FIG. 6 is a circuit diagram showing a specific example of a drive transistor in the counter latch according to the embodiment.

The drive transistor DRVTr includes two MOS transistors connected in series between a given potential (for example, the ground potential) and the data transfer line 154 as shown in FIG. 6.

That is, the drive transistor DRVTr OF FIG. 6 includes a select transistor NT1 formed by an n-channel MOS (NMOS) and a data transistor NT2 formed by an NMOS, which are connected in series between a ground potential GND and the data transfer line 154.

A gate of the select transistor NT1 is connected to any of the selection lines LSEL0 to LSELn driven by the column scanning circuit 130 and a gate of the data transistor NT2 is connected to an output of the latch LTC.

The drive transistor DRVTr is selected by the selection lines LSEL0 to LSELn driven by outputs from the column scanning circuit 130.

Then, the state of the transistor NT2 determined by latch data is read by the sense amplifier circuits 171-0 to 171-*m* as data detection circuits through the data transfer lines (SA bus) 154-0 to 154-*m*.

When the latch data is "1", a current path is formed and current flows in the drive transistor DRVTr. When the latch data is "0", the current path is shut and current does not flow.

Figure 7:
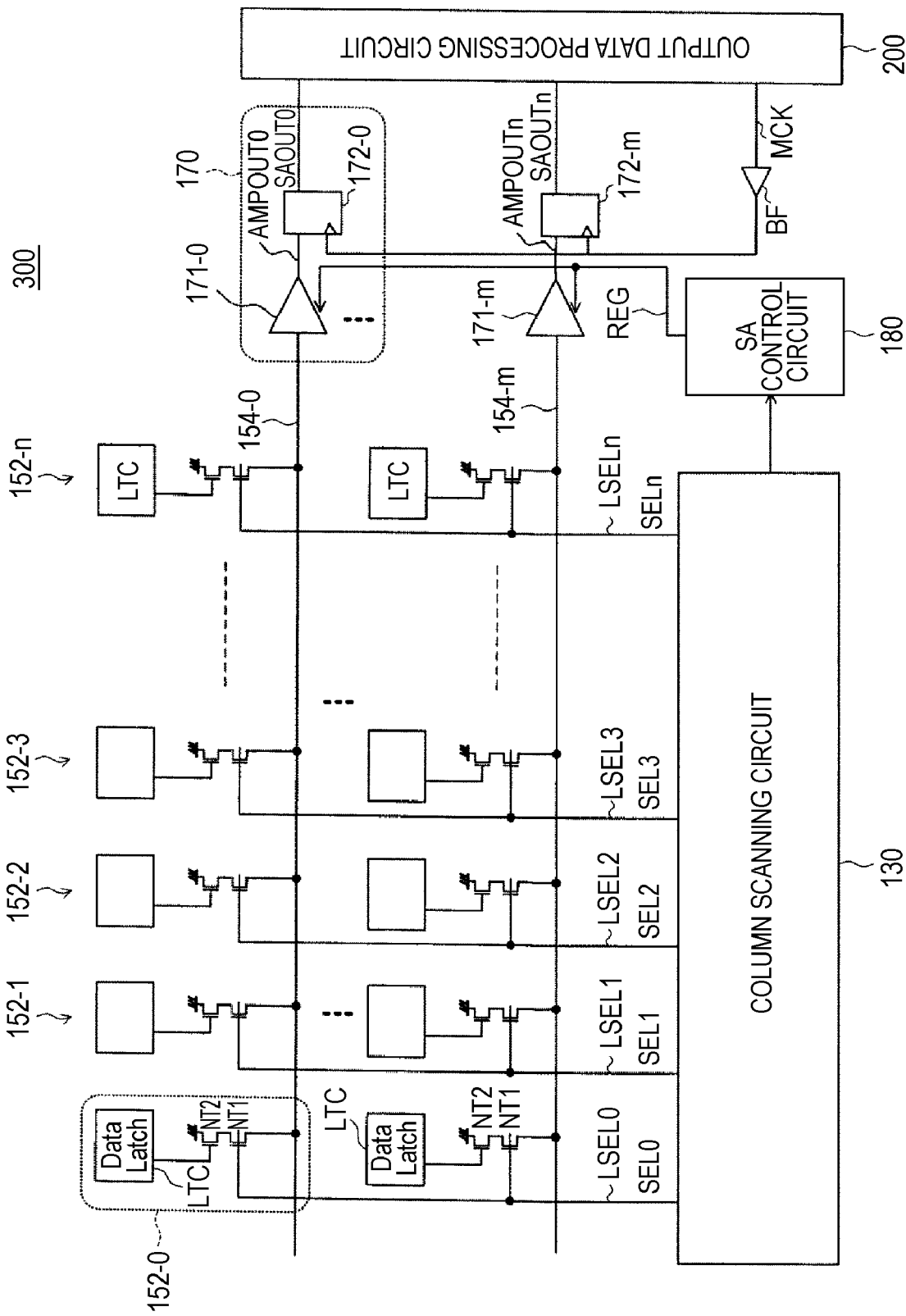
FIG. 7 is a circuit diagram showing a more specific configuration example of a data transfer system according to the embodiment to which the circuit of FIG. 6 is applied.

FIG. 7 is a circuit diagram showing a more specific configuration example of a data transfer system 300 according to the embodiment to which the circuit of FIG. 6 is applied.

In FIG. 7, the data output circuits 170 include data synchronization circuits 172-0 to 172-*m* formed by, for example, flip-flops at the output side of the sense amplifier circuits 171-0 to 171-*m*.

The sense amplifier circuits 171-0 to 171-*m* to which end portions of respective data transfer lines 154-0 to 154-*m* are connected amplify and read (detect) the transferred data.

The data synchronization circuits 172-0 to 172-*m* take outputs from the sense amplifier circuits 171-0 to 171-*m* in synchronization with a taking clock SACK, outputting the data to the output data processing circuit 200.

In the data transfer system 300 according to the embodiment, plural counter latches 152 are connected to respective data transfer lines 154-0 to 154-*m*.

Which data will be transferred is controlled by the selection lines LSEL0 to LSELn driven by outputs of the column scanning circuit 130. Then, data transferred through the data transfer lines 154-0 to 154-*m* is read by the sense amplifier circuits 171-1 to 171-*m*.

The sense amplifier control circuit 180 controls drive performance of the sense amplifier circuits 171-1 to 171-*m* by the control signal REG in accordance with the length of the data transfer distance.

In the embodiment, the sense amplifier control circuit 180 acquires information of the length of the data transfer distance from a not-shown selection line control circuit in the column scanning circuit 130.

However, as have been explained in the first embodiment, in the case that the configuration of the data bus and the order of controlling selection lines are previously recognized, information of the length of the transfer distance can be included in the sense amplifier control circuit 180 directly, and it is not indispensable that information is acquired from the selection line control circuit.

The parallelism of the data transfer lines 154 and the number of counter latches 152 connected to data transfer lines 154 are optional.

[Second Configuration Example of the Data Transfer System]

Figure 8:
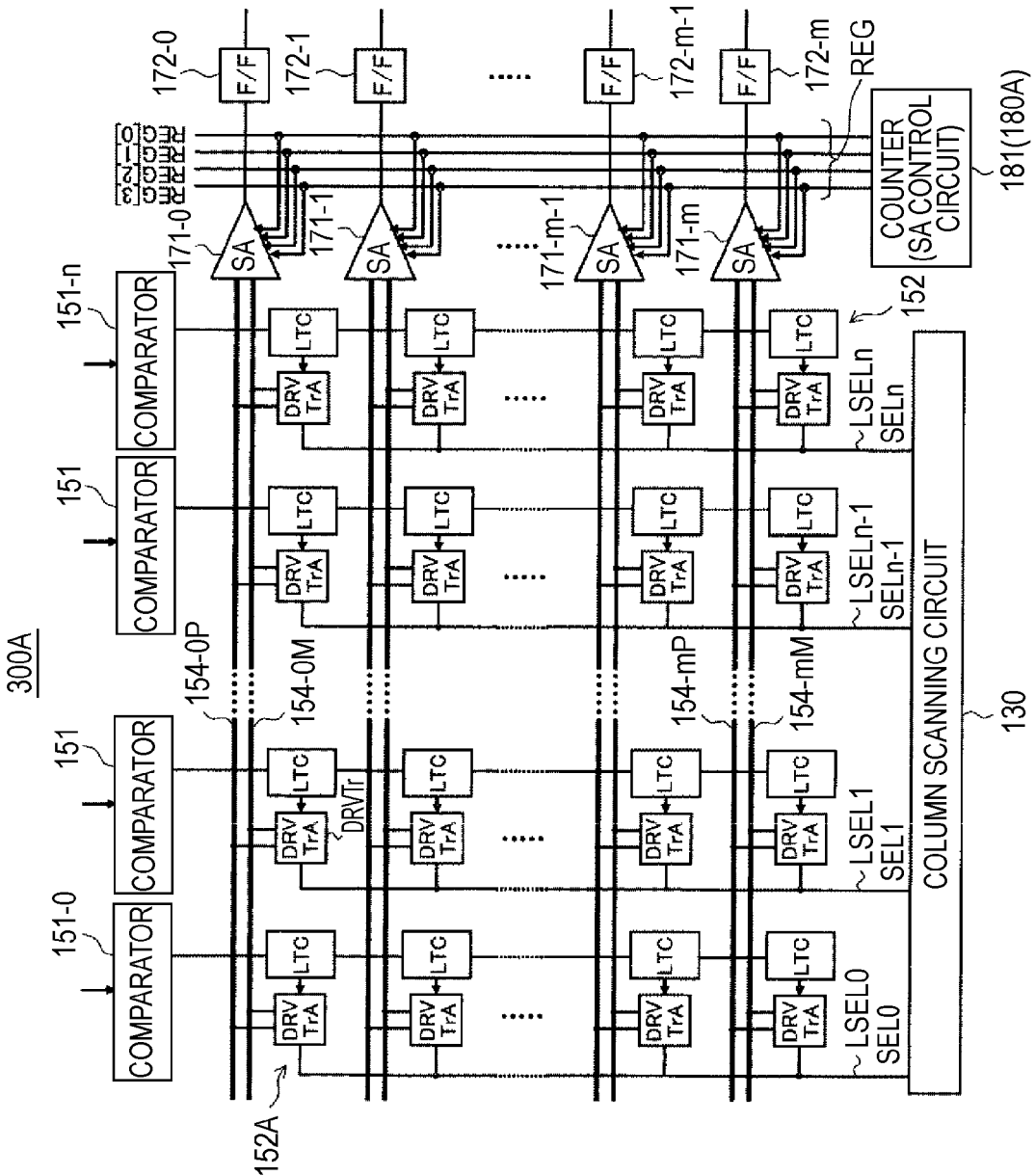
FIG. 8 is a diagram showing an example of the entire configuration of the data transfer system applying a differential transmission system including the sense amplifier circuits (SA) having the function capable of adjusting drive performance based on information of the length of the data transfer distance.

FIG. 8 is a diagram showing an example of the entire configuration of the data transfer system applying a differential transmission system including the sense amplifier circuits (SA) having the function capable of adjusting drive performance based on information of the length of the data transfer distance.

Figure 9:
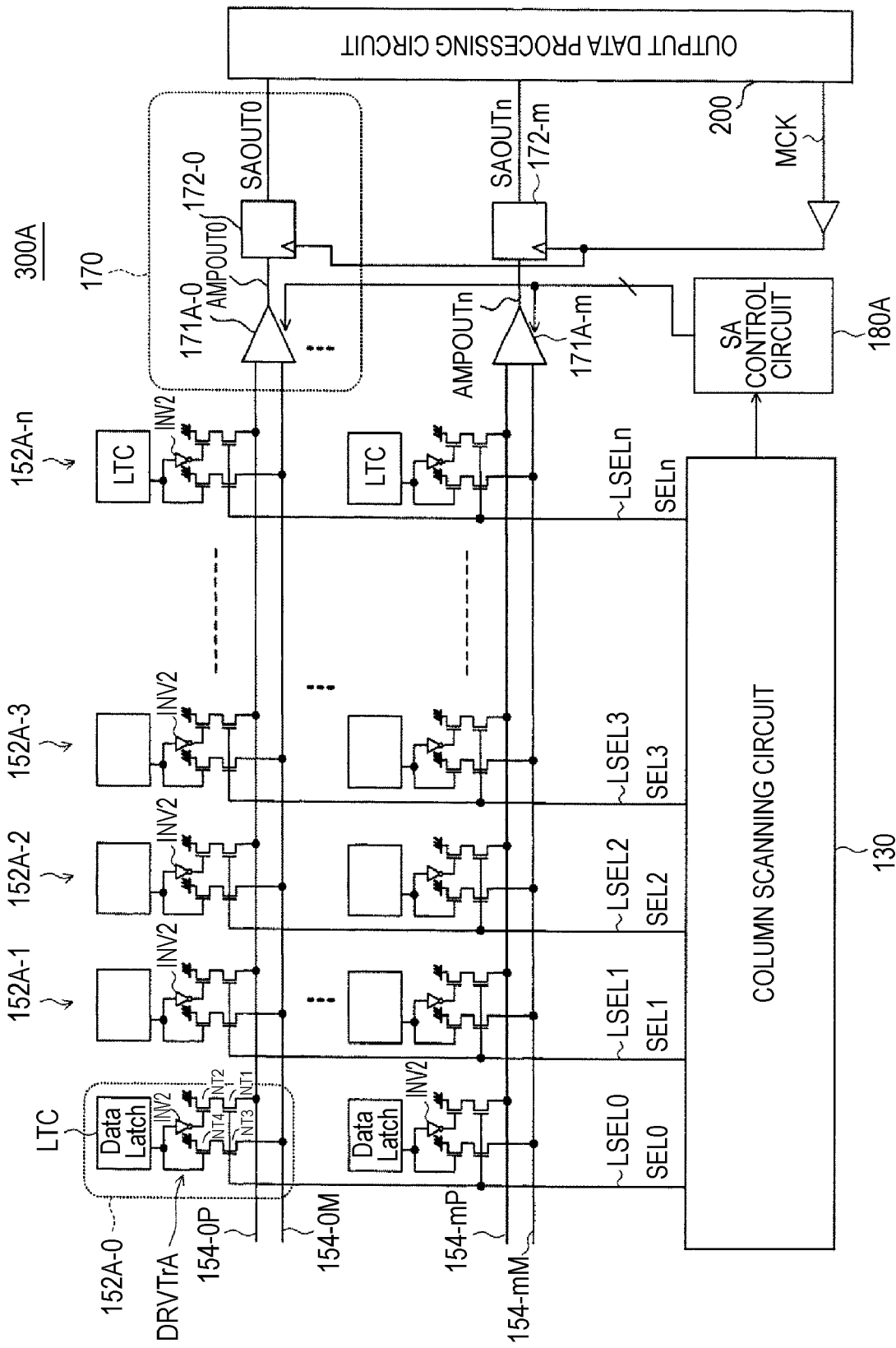
FIG. 9 is a circuit diagram showing a more specific configuration example of the data transfer system applying the differential transmission system according to the embodiment.

FIG. 9 is a circuit diagram showing a more specific configuration example of the data transfer system applying the differential transmission system according to the embodiment.

Though the data transfer line 154 is configured by a signal line in FIG. 5 and FIG. 7, the differential transmission system using a two-line data bus with respect to one data as shown in FIG. 8 and FIG. 9 can be applied.

A data transfer system 300A of the differential transmission system, differential-type sense amplifier circuits 171A-0 to 171A-m are used as shown in FIGS. 8 and 9.

A basic configuration is almost the same as the above except that two data transfer lines are used with respect to each channel (ch) because of the differential type.

Thus, counter latches 152A-0 to 152A-n are configured so as to allow complementary data to flow in data transfer lines 154-0P, 154-0M to 154-*m*P, 154-*m*M.

Each of the counter latches 152A-0 to 152A-n has a data latch LTC and a drive transistor DRVTrA as described above.

The drive transistor DRVTrA includes two-pairs of MOS transistors, in which each pair is connected in series between a given potential (for example, the ground potential) and each of the data transistor lines 154-0M to 154-*m*M, and between the given potential and each of the data transfer lines 154-0P to 154-*m*P.

That is, the drive transistor DRVTrA of FIG. 9 includes the select transistor NT1 formed by an NMOS and the data transistor NT2 formed by an NMOS, which are connected in series between the ground potential GND and each of data transfer lines 154-0M to 154-*m*M.

The drive transistor DRVTrA of FIG. 9 further includes a select transistor NT3 formed by an NMOS and a data transistor NT4 formed by an NMOS, which are connected in series between the ground potential GND and each of data transfer lines 154-0P to 154-*m*P.

Gates of select transistors NT1 and NT3 are connected to selection lines LSEL0 to LSELn driven by the column scanning circuit 130.

A gate of the data transistor NT2 is connected to the output of the latch LTC, and a gate of the data transistor NT4 is connected to the output of the latch LTC through an inverter INV2.

According to the data transfer system 300A of FIG. 8 and FIG. 9, a noise margin is increased by applying the differential configuration.

In the data transfer system 300A, the AD converted data is stored in the latch LTC of the counter latch 152.

A data signal of the full amplitude is converted into a differential signal of a minute amplitude by the drive transistor DRVTrA as a data transmission unit and transferred to the data transfer lines 154-0M to 154-*m*M, 154-0P to 154*m*P.

Differential data D, XD transmitted through the data transfer lines 154-0M to 154-*m*M, 154-0P to 154*m*P is read by the sense amplifier circuits 171A-0 to 171A-m and restored to data signals of the full amplitude again.

The data signals restored to the data signals of the full amplitude by the sense amplifier circuits 171A-0 to 171A-m are stored in flip-flops (FF) 172-0 to 172-*m* as data synchronization circuits forming latches.

The order of reading columns is controlled by the selection signals SEL0 to SELn outputted from the column scanning circuit 130 through the selection lines LSEL0 to LSELn.

A sense amplifier control circuit 180A controls drive performance of the sense amplifier circuits 171A-0 to 171A-m by the control signal REG in accordance with the length of the data transfer distance.

The sense amplifier control circuit 180A includes a counter 181.

Information of the length of the data transfer distance is generated by the counter 181. The counter 181 counts the number of columns read out from the end, recognizing to which column data to be read belongs by the counter value.

Since the whole number of columns is known, information of the length of the data transfer distance can be generated from the counter value.

In the embodiment, the wiring length is divided into 16 areas, the length of the data transfer distance is represented by 4-bit control signals REG(0) to (3), and the sense amplifier circuits 171A-0 to 171A-m by the control signals REG(0) to (3) as an example.

The information representing the length of the data transfer distance can be any bit.

[Specific Circuit Example of the Sense Amplifier Circuit]

Next, a specific circuit example of the sense amplifier circuit capable of adjusting drive performance based on information of the length of the data transfer distance will be explained.

Figure 10:
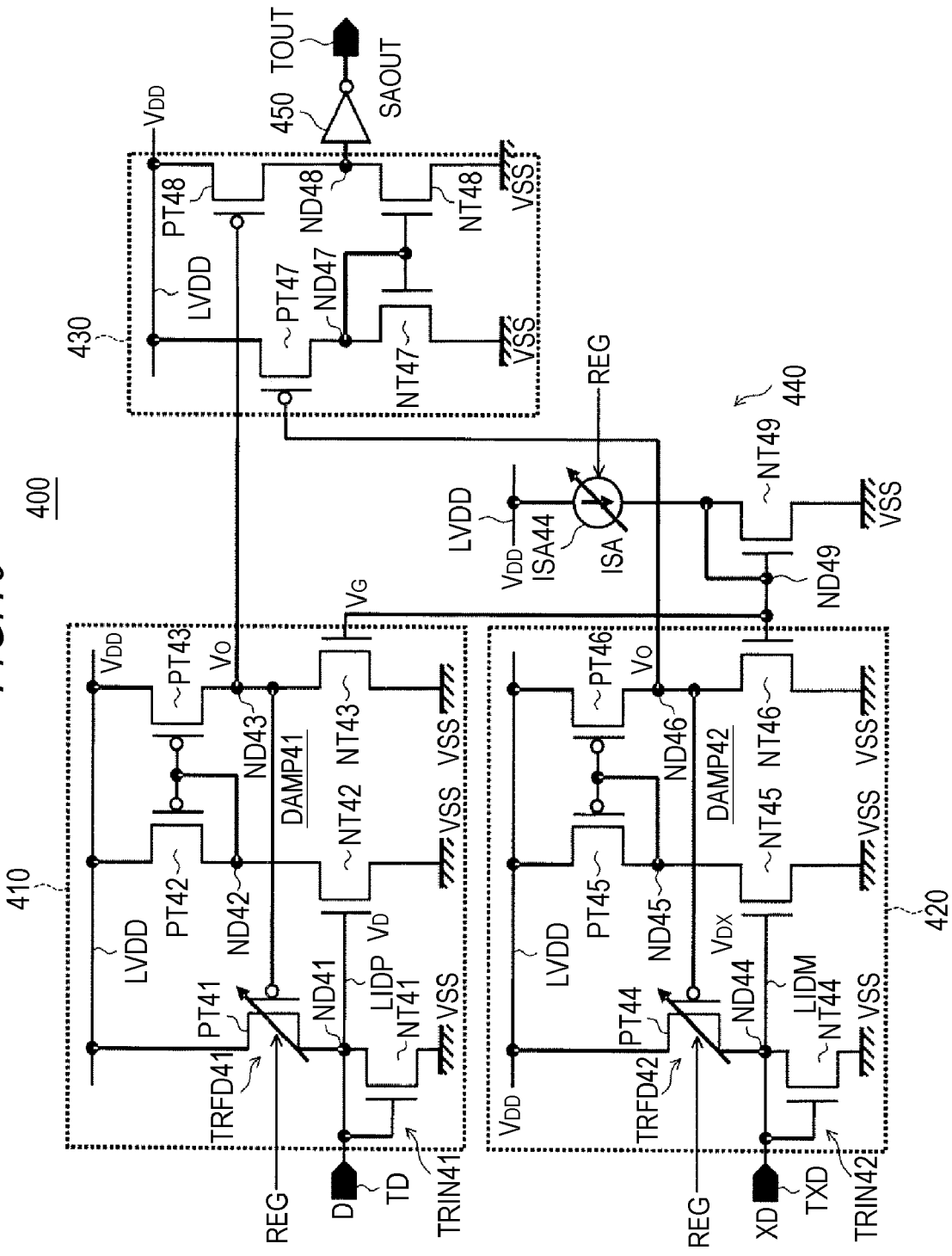
FIG. 10 is a circuit diagram showing a configuration example of the sense amplifier circuit capable of adjusting drive performance based on information of the length of the data transfer distance according to the embodiment.

FIG. 10 is a circuit diagram showing a configuration example of the sense amplifier circuit capable of adjusting drive performance based on information of the length of the data transfer distance according to the embodiment.

Hereinafter, the sense amplifier circuit 171 is represented by numeral 400.

The sense amplifier circuit 400 of FIG. 10 includes first and second front-stage amplifiers 410, 420 as first amplifiers and a rear-stage amplifier 430 as a second amplifier, a threshold voltage generating unit 440, an inverter 450, input terminals TD, TXD and an output terminal TOUT.

The first front-stage amplifier 410 includes a feedback transistor unit TRFD41 as a feedback unit, an input stage transistor TRIN41, a differential amplifier DAMP41, nodes ND41, ND42 and ND43.

The feedback transistor unit TRFD41 functions as a feedback transistor for feeding back the amplified signal to the data transfer line 154-P.

The feedback transistor unit TRFD41 is formed by plural p-channel MOS (PMOS) transistors having different gate widths W arranged in parallel between a supply line LVDD of power supply voltage VDD and a data input line LIDP of the input terminal TD as described later.

In the feedback transistor unit TRFD41, the conductivity state of plural PMOS transistors having different gate widths W is controlled in accordance with control signals RWEG (0) to (3) from the sense amplifier circuit 180A. The transistors having different gate widths are different in drive performance. The larger the gate width W is, the higher the drive performance is.

In FIG. 10, the feedback transistor unit TRFD41 is shown by adding an arrow including a meaning of "variable" to a PMOS transistor PT41.

A source of the PMOS transistor PT41 is connected to the supply line LVDD of the power supply voltage VDD and a drain thereof is connected to the node ND41 connected to the input terminal TD.

The input stage transistor TRIN41 is formed by an NMOS transistor NT41 which is diode-connected.

A drain and a gate of the NMOS transistor NT41 are connected to the node ND41, namely, a drain of a PMOS transistor PT41 and the input terminal TD, and a source thereof is connected to a reference potential (for example, ground potential) source VSS.

The differential amplifier DAMP41 performs differential amplification of the difference between an input voltage $V_D$ inputted through the input terminal TD and a threshold voltage $V_G$ from the threshold voltage generating unit, and outputs the amplified signal to the rear-stage amplifier 430.

The differential amplifier DAMP41 includes PMOS transistors PT42, PT43 and NMOS transistors NT42, NT43.

A source of the PMOS transistor PT42 and a source of the PMOS transistor PT43 are connected to the supply line LVDD of the power supply voltage VDD.

A drain of the PMOS transistor PT42 is connected to a drain of the NMOS transistor NT42, and a connection point forms the node ND42. The node ND42 is connected to a gate of the PMOS transistor PT42 and a gate of the PMOS transistor PT43.

A source of the NMOS transistor NT42 is connected to the reference potential source VSS and a gate thereof is connected to the input terminal TD through the node ND41.

A source of the NMOS transistor NT43 is connected to the reference potential source VSS and a gate thereof is connected to the supply line of the threshold voltage $V_G$.

A drain of the PMOS transistor PT43 is connected to a drain of the NMOS transistor NT43, and a connection point thereof forms the output node ND43 of the differential amplifier DAMP41.

The node ND43 is connected (fed back) to one of inputs of the rear-stage amplifier 430 of the subsequent stage as well as connected to a gate of the PMOS transistor PT41.

The second front-stage amplifier 420 includes a feedback transistor unit TRFD42, an input-stage transistor TRIN42, a differential amplifier unit DAMP42, nodes ND44, ND45 and ND46.

The feedback transistor unit TRFD42 functions as a feedback transistor for feeding back the amplified signal to a data transfer line 154-M.

The feedback transistor unit TRFD42 is formed by plural PMOS transistors having different gate widths W connected in parallel between the supply line LVDD of the power supply voltage VDD and a data input line LIDM.

In the feedback transistor unit TRFD42, the conductivity state of plural PMOS transistors having different gate widths W is controlled in accordance with control signals RWEG (0) to (3) from the sense amplifier circuit 180A.

In FIG. 10, the feedback transistor unit TRFD42 is shown by adding an arrow including a meaning of "variable" to a PMOS transistor PT44.

A source of the PMOS transistor PT44 is connected to the supply line LVDD of the power supply voltage VDD and a drain thereof is connected to the node ND44 connected to the input terminal TDX.

The input stage transistor TRIN42 is formed by an NMOS transistor NT44 which is diode-connected.

A drain and a gate of the NMOS transistor NT44 are connected to the node ND44, namely, a drain of a PMOS transistor PT44 and the input terminal TDX, and a source thereof is connected to a reference potential source VSS.

The differential amplifier DAMP42 performs differential amplification of the difference between an input voltage $V_{DX}$ inputted through the input terminal TDX and the threshold voltage $V_G$ from the threshold voltage generating unit, and outputs the amplified signal to the rear-stage amplifier 430.

The differential amplifier DAMP42 includes PMOS transistors PT45, PT46 and NMOS transistors NT45, NT46.

A source of the PMOS transistor PT45 and a source of the PMOS transistor PT46 are connected to the supply line LVDD of the power supply voltage VDD.

A drain of the PMOS transistor PT45 is connected to a drain of the NMOS transistor NT45, and a connection point forms the node ND45. The node ND45 is connected to a gate of the PMOS transistor PT45 and a gate of the PMOS transistor PT46.

A source of the NMOS transistor NT45 is connected to the reference potential source VSS and a gate thereof is connected to the input terminal TDX through the node ND44.

A source of the NMOS transistor NT46 is connected to the reference potential source VSS and a gate thereof is connected to the supply line of the threshold voltage $V_G$.

A drain of the PMOS transistor PT46 is connected to a drain of the NMOS transistor NT46, and a connection point thereof forms the output node ND46 of the differential amplifier DAMP42.

The node ND46 is connected (fed back) to the other of inputs of the rear-stage amplifier 430 of the subsequent stage as well as connected to a gate of the PMOS transistor PT44.

The rear-stage amplifier 430 performs differential amplification of an output of the first front-stage amplifier 410 and an output of the second front-stage amplifier 420 to obtain an output SAOUT of the sense amplifier circuit 171A.

The rear-stage amplifier 430 includes PMOS transistors PT47, PT48 and NMOS transistors NT47, NT48.

A source of the PMOS transistor PT47 and a source of the PMOS transistor PT48 are connected to the supply line LVDD of the power supply voltage VDD.

A drain of the PMOS transistor PT47 is connected to a drain of the NMOS transistor NT47, and a connection point thereof forms a node ND47. The node ND47 is connected to a gate of the NMOS transistor NT47 and a gate of the NMOS transistor NT48.

A source of the NMOS transistor NT47 and a source of the NMOS transistor NT48 are connected to the reference potential source VSS.

A drain of the PMOS transistor PT48 is connected to a drain of the NMOS transistor NT48, and a connection point forms an output node ND48 of the rear-stage amplifier 430.

The output node ND48 is connected to an input of the inverter 450, and an output of the inverter 450 is connected to the output terminal OUT.

The threshold voltage generating unit 440 generates the threshold voltage $V_G$, and supplies the generated threshold voltage $V_G$ to the first front-stage amplifier 410 and the second front-stage amplifier 420.

The threshold voltage generating unit 440 includes a reference current source ISA44 and an NMOS transistor NT49.

The reference current source ISA44 is connected to a drain and a gate of the NMOS transistor NT49, and a connecting point forms the node ND49. A source of the NMOS transistor NT49 is connected to the reference potential source VSS.

The node ND49 is connected to the gate of the NMOS transistor NT43 of the first front-stage amplifier 410 and the gate of the NMOS transistor NT46 of the second front-stage amplifier 420.

The sense amplifier circuit 171A of the embodiment has a configuration capable of changing the effective gate width of the feedback transistors PT41, PT44 and the amount of current the reference current ISA of the reference current source ISA44 for adjusting drive performance according to the length of the data transfer distance.

[Specific Example of Adjusting Drive Performance According to the Length of the Data Transfer Distance]

Figure 11:
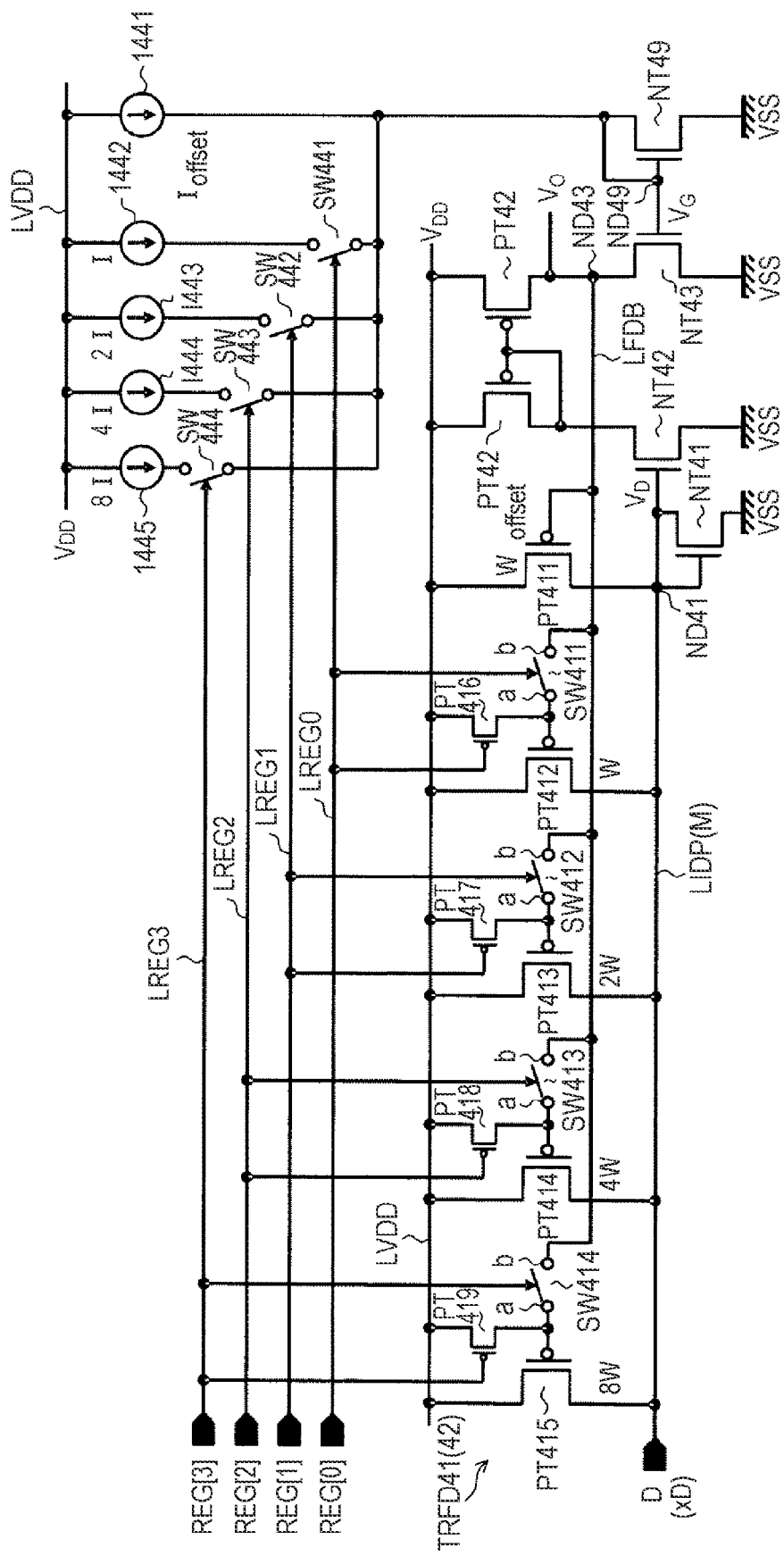
FIG. 11 is a diagram showing a specific configuration example of a circuit capable of changing the effective gate width and the amount of reference current ISA of a feedback transistor according to the length of the data transfer distance.

FIG. 11 is a diagram showing a specific configuration example of a circuit capable of changing the effective gate width of a feedback transistor and the amount of reference current ISA according to the length of the data transfer distance.

FIG. 11 is a diagram shown by taking out the first front-stage amplifier 410 and the threshold voltage generating unit 440.

The feedback transistor unit TRFD41 includes PMOS transistors PT411, PT412, PT413, PT414 and PT415 connected in parallel between the supply line LVDD of the power supply voltage VDD and the input line LIDP.

The feedback transistor unit TRFD41 includes switches SW411, SW412, SW413 and SW414 connected between a feedback line LFDB connected to the node ND43 and gates of the PMOS transistors PT412, PT413, PT414 and PT415.

The feedback transistor unit TRFD41 includes PMOS transistors PT416, PT417, PT418 and PT419 connected between the supply line LVDD of the power supply voltage VDD and gates of the PMOS transistors PT412, PT413, PT414 and PT415.

The PMOS transistors PT416, PT417, PT418 and PT419 function as switching transistors.

The PMOS transistor PT411 is a transistor for determining the offset feedback amount.

The PMOS transistor PT411 is connected to the supply line LVDD of the power supply voltage VDD at a source thereof, connected to the input line LIDP at a drain thereof, and connected to the feedback line LFDB at a gate thereof.

The gate width W of the PMOS transistor PT412 is set to "W".

The PMOS transistor PT412 is connected to the supply line LVDD of the power supply voltage VDD at a source thereof, connected to the input line LIDP at a drain thereof and connected to a terminal "a" of the switch SW411 and a drain of the PMOS transistor PT416 at a gate thereof.

The gate width W of the PMOS transistor PT413 is set to "2W".

The PMOS transistor PT413 is connected to the supply line LVDD of the power supply voltage VDD at a source thereof, connected to the input line LIDP at a drain thereof and connected to a terminal "a" of the switch SW412 and a drain of the PMOS transistor PT417 at a gate thereof.

The gate width W of the PMOS transistor PT414 is set to "4W".

The PMOS transistor PT414 is connected to the supply line LVDD of the power supply voltage VDD at a source thereof, connected to the input line LIDP at a drain thereof and connected to a terminal "a" of the switch SW413 and a drain of the PMOS transistor PT418 at a gate thereof.

The gate width W of the PMOS transistor PT415 is set to "8W".

The PMOS transistor PT415 is connected to the supply line LVDD of the power supply voltage VDD at a source thereof, connected to the input line LIDP at a drain thereof and connected to a terminal "a" of the switch SW414 and a drain of the PMOS transistor PT419 at a gate thereof.

The switch SW411 is connected to the gate of the PMOS transistor PT412 at a terminal "a" thereof, connected to the feedback line LFDB at a terminal "b" thereof and connected to a supply line LREG0 of a control signal REG(0) at a control terminal thereof.

When the control signal REG(0) is logic "1", the switch SW411 holds the terminal "a" and the terminal "b" in a conductive state. When the control signal REG(0) is logic "0", the switch SW411 holds the terminal "a" and the terminal "b" in a non-conductive state.

The switch SW412 is connected to the gate of the PMOS transistor PT413 at the terminal "a" thereof, connected to the feedback line LFDB at the terminal "b" thereof and connected to a supply line LREG1 of a control signal REG(1) at a control terminal thereof.

When the control signal REG(1) is logic "1", the switch SW412 holds the terminal "a" and the terminal "b" in the conductive state. When the control signal REG(1) is logic "0", the switch SW412 holds the terminal "a" and the terminal "b" in the non-conductive state.

The switch SW413 is connected to the gate of the PMOS transistor PT414 at the terminal "a" thereof, connected to the feedback line LFDB at the terminal "b" thereof and connected to a supply line LREG2 of a control signal REG(2) at a control terminal thereof.

When the control signal REG(2) is logic "1", the switch SW413 holds the terminal "a" and the terminal "b" in the conductive state. When the control signal REG(2) is logic "0", the switch SW413 holds the terminal "a" and the terminal "b" in the non-conductive state.

The switch SW414 is connected to the gate of the PMOS transistor PT415 at the terminal "a" thereof, connected to the feedback line LFDB at the terminal "b" thereof and connected to a supply line LREG3 of a control signal REG(3) at a control terminal thereof.

When the control signal REG(3) is logic "1", the switch SW414 holds the terminal "a" and the terminal "b" in the conductive state. When the control signal REG(3) is logic "0", the switch SW414 holds the terminal "a" and the terminal "b" in the non-conductive state.

The PMOS transistor PT416 is connected to the supply line LVDD of the power supply voltage VDD at a source thereof, connected to the gate of the PMOS transistor PT412 at a drain thereof and connected to the supply line of the control signal (0) at a gate thereof.

When the control signal REG(0) is logic "1", the PMOS transistor PT416 is held in the non-conductive state. When the control signal REG(0) is logic "0", the PMOS transistor PT416 is held in the conductive state and allows the transistor PT412 to be in the non-conductive state.

The PMOS transistor PT416 and the switch SW411 are complementarily turned on and off by the control signal REG "0".

The PMOS transistor PT417 is connected to the supply line LVDD of the power supply voltage VDD at a source thereof, connected to the gate of the PMOS transistor PT413 at a drain thereof and connected to the supply line of the control signal REG(1) at a gate thereof.

When the control signal REG(1) is logic "1", the PMOS transistor PT417 is held in the non-conductive state. When the control signal REG(1) is logic "0", the PMOS transistor PT417 is held in the conductive state and allows the PMOS transistor PT413 to be in the non-conductive state.

The PMOS transistor PT417 and the switch SW412 are complementarily turned on and off by the control signal REG "1".

The PMOS transistor PT418 is connected to the supply line LVDD of the power supply voltage VDD at a source thereof, connected to the gate of the PMOS transistor PT414 at a drain thereof and connected to the supply line of the control signal REG(2) at a gate thereof.

When the control signal REG(2) is logic "1", the PMOS transistor PT418 is held in the non-conductive state. When the control signal REG(2) is logic "0", the PMOS transistor PT418 is held in the conductive state and allows the PMOS transistor PT414 to be in the non-conductive state.

The PMOS transistor PT418 and the switch SW413 are complementarily turned on and off by the control signal REG "2".

The PMOS transistor PT419 is connected to the supply line LVDD of the power supply voltage VDD at a source thereof, connected to the gate of the PMOS transistor PT415 at a drain thereof and connected to the supply line of the control signal REG(3) at a gate thereof.

When the control signal REG(3) is logic "1", the PMOS transistor PT419 is held in the non-conductive state. When the control signal REG(3) is logic "0", the PMOS transistor PT419 is held in the conductive state and allows the PMOS transistor PT415 to be in the non-conductive state.

The PMOS transistor PT419 and the switch SW414 are complementarily turned on and off by the control signal REG "3".

The reference current source ISA44 includes current sources I441, I442, I443, I444, I445 and switches SW441, SW442, SW443 and SW444.

The current sources I441 to I445 are connected to the supply line LVDD of the power supply voltage VDD in common.

The current source I441 is a current source for determining offset reference current.

A current output terminal of the current source I441 is connected to the drain and gate of the NMOS transistor NT49, namely, the node ND49.

A current value of the current source I442 is set to "I".

A current output terminal of the current source I442 is connected to the switch SW441.

A current value of the current source I443 is set to "2I".

A current output terminal of the current source I443 is connected to the switch SW442.

A current value of the current source I444 is set to "4I".

A current output terminal of the current source I444 is connected to the switch SW443.

A current value of the current source I445 is set to "8I".

A current output terminal of the current source I445 is connected to the switch SW444.

The switch SW441 is connected to the node ND49 at a terminal "a" thereof, connected to the current output terminal of the current source I442 at a terminal "b" thereof and connected to the supply line LREG0 of the control signal REG(0) at a control terminal thereof.

When the control signal REG(0) is logic "1", the switch SW441 holds the terminal "a" and the terminal "b" in the conductive state. When the control signal REG(0) is logic "0", the switch SW441 holds the terminal "a" and the terminal "b" in the non-conductive state.

The switch SW442 is connected to the node ND49 at a terminal "a" thereof, connected to the current output terminal of the current source I443 at a terminal "b" thereof and connected to the supply line LREG1 of the control signal REG(1) at a control terminal thereof.

When the control signal REG(1) is logic "1", the switch SW442 holds the terminal "a" and the terminal "b" in the conductive state. When the control signal REG(1) is logic "0", the switch SW442 holds the terminal "a" and the terminal "b" in the non-conductive state.

The switch SW443 is connected to the node ND49 at a terminal "a" thereof, connected to the current output terminal of the current source I444 at a terminal "b" thereof and connected to the supply line LREG2 of the control signal REG(2) at a control terminal thereof.

When the control signal REG(2) is logic "1", the switch SW443 holds the terminal "a" and the terminal "b" in the conductive state. When the control signal REG(2) is logic "0", the switch SW443 holds the terminal "a" and the terminal "b" in the non-conductive state.

The switch SW444 is connected to the node ND49 at a terminal "a" thereof, connected to the current output terminal of the current source I445 at a terminal "b" thereof and connected to the supply line LREG3 of the control signal REG(3) at a control terminal thereof.

When the control signal REG(3) is logic "1", the switch SW444 holds the terminal "a" and the terminal "b" in the conductive state. When the control signal REG(3) is logic "0", the switch SW444 holds the terminal "a" and the terminal "b" in the non-conductive state.

As described above, the feedback transistor unit TRFD 41 (42) according to the embodiment includes the PMOS transistor PT411 determining the offset feedback amount and four PMOS transistors PT412 to PT415 having different gate widths in parallel to the PMOS transistor PT411.

The four PMOS transistors PT412 to PT415 are controlled by 4-bit control signals REG(0) to (3) respectively, which represent the length of the data transfer distance in stages.

Whether the PMOS transistors PT412 to PT415 are available or not as feedback transistors is controlled according to on/off of the switches SW411 to SW414.

The gate widths of the four PMOS transistors PT412 to PT415 are set to W, 2W, 4W and 8W respectively, and the effective gate width can be controlled in stages according to values of the control signals REG(0) to (3).

Similarly, the reference current source ISA44 includes the current source I441 determining the offset reference current and four current sources I442 to I445 having different current amounts in parallel to the current source I441.

The four current sources I442 to I445 are controlled by 4-bit control signals REG(0) to (3), and the sum of current values are controlled according to on/off of the switches SW441 to SW444.

The current values of the four current sources I442 to I445 are set to I, 2I, 4I and 8I respectively, and the effective current values can be controlled in stages according to values of the control signals REG(0) to (3).

The setting values of the respective gate widths and the current values are not limited to the above examples and can be optional.

Figure 12:
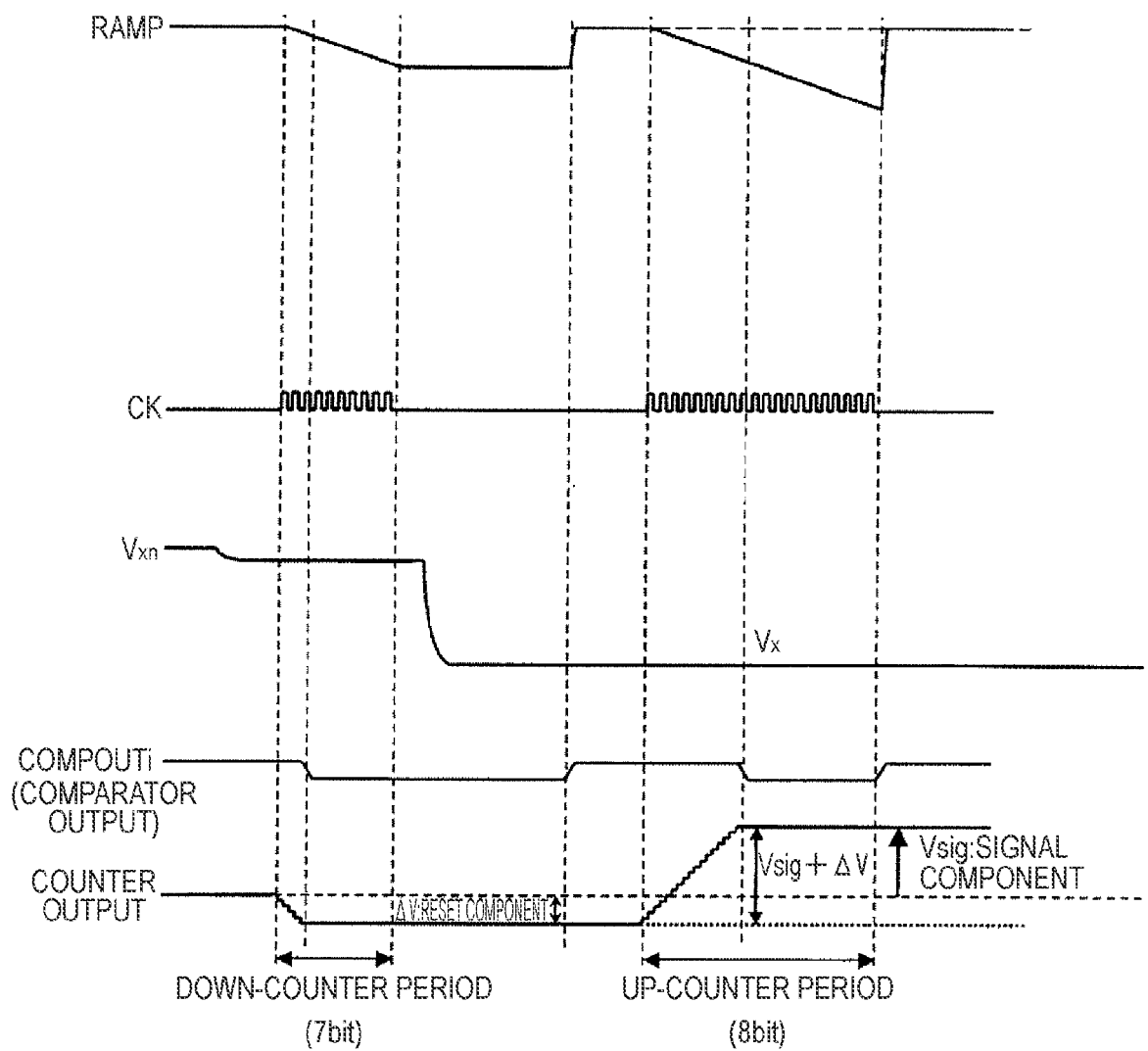
FIG. 12 is a timing chart for explaining operations of the solid-state imaging device of FIG. 3.

Next, operations of the solid-state imaging device (CMOS image sensor) 100 according to the embodiment will be explained with reference to a timing chart of FIG. 12, the block diagram of FIG. 3 and the circuit diagram of FIG. 10.

After the first reading from unit pixels 111 of an arbitrary row Hx to the column lines V0, V1, . . . becomes stable, a ramp waveform RAMP based on a reference voltage is outputted from the output of DAC 160.

The ramp waveform RAMP based on the reference voltage is inputted in a shape of stairs as a reference voltage REF of the comparators 151. In each comparator 151, comparison with respect to a voltage of an arbitrary column line Vx is performed.

At this time, the counter latch 152 is in a down-counting state, performing reset-counting. When the reference voltage REF and voltage of Vx becomes equal, an output COMPOUTi from the comparator 151 is inverted, the down-counting operation is stopped and the count is held.

An initial value of the counter latch 152 is an arbitrary value of in gradations of AD conversion, for example, "0". During the reset-counting period, a reset component $\Delta V$ of the unit pixel 111 is read out.

After that, when the column lines V0, V1, . . . becomes stable according to the incident light amount, the ramp waveform RAMP is inputted as the reference voltage REF in a data counting period, and comparison with respect to voltages of arbitrary lines V0, V1, . . . is performed in the comparators 151.

In parallel with the input of the ramp waveform RAMP which is staircase wave, up-counting is performed in each counter latch 152. When the reference voltage REF and the voltage of Vx becomes equal, the output COMPOUTi of the comparator 151 is inverted and the count corresponding to the comparison period is held.

The counter value held by the latch LTC of the counter latch 152 is scanned by the column scanning circuit 13 as a digital data signal having the full amplitude.

The data signal having the full amplitude is converted to a differential signal of minute amplitude by the drive transistor DRVTr and transferred to the data transfer lines 154-0M to 154-mM, 154-0P to 154-mP.

The differential data D, XD transmitted through the data transfer lines 154-0M to 154-mM, 154-0P to 154-mP is read by the sense amplifier circuits 171A-0 to 171A-m, and restored to data signals having the full amplitude again.

In the sense amplifier circuits 171A-0 to 171A-m, the data D, XD transmitted through the data transfer lines 154 as the differential signals having the minute amplitude is amplified in the front-stage amplifiers 410, 420 respectively and restored into the original data signals having the full amplitude in the rear-stage amplifier 430.

Specific processing will be explained by citing the front-stage amplifier 410 as an example.

In the front-stage amplifier 410, the input voltage $V_D$ of the data bus is applied to the gate of the NMOS transistor NT42 on the side of positive input of the differential amplifier DAMP41 and the threshold voltage $V_G$ is applied to the gate of the NMOS transistor NT43 on the side of negative input, and the difference therebetween is amplified.

The threshold voltage $V_G$ is generated by the reference current source ISA44.

An output $V_o$ of the differential amplifier DAMP41 is fed back to the input through the feedback transistor unit TRFD41.

When the potential of the input voltage $V_D$ is reduced and $V_G$ is higher than $V_D$, the potential of the output $V_O$ becomes low, feedback becomes high in the feedback transistor PT41 to which the output voltage $V_O$ is applied at the gate thereof, and electric current is supplied from the power supply, therefore, the input voltage $V_D$ moves in the direction increasing the potential from the direction reducing the potential.

On the other hand, when the potential of the input voltage $V_D$ is increased and $V_D$ is higher than $V_G$, the potential of the output $V_O$ becomes high, feedback becomes low in the feedback transistor PT41, and electric current from the power supply is restricted, therefore, the input voltage $V_D$ moves in the direction reducing the potential from the direction increasing the potential.

According to the feedback operation, the minute voltage difference is kept in the input voltage. Factors determining transfer speed in the sense amplifier circuits 171A-0 to 171A-m are chiefly the feedback transistor PT41 and the reference current ISA which is necessary for forming the threshold voltage.

That is because the former determines the feedback amount by the gate width of the transistor directly and the latter determines speed of charging/discharging the potential $V_o$ applied to the gate of the feedback transistor PT41.

As the gate width of the feedback transistor PT41 is wider and the reference current ISA is higher, feedback becomes higher and transfer speed becomes higher.

Accordingly, the control signals REG(0) to (3) in accordance with the length of the data transfer distance are supplied to the sense amplifier circuits 171A-1 to 171A-m by the sense amplifier control circuit 180A, and drive performance of the sense amplifier circuits 171A-1 to 171A-m is controlled.

Thus, in the sense amplifier circuits 171A-1 to 171A-m, effective gate width of the feedback transistor PT41 and the current amount of the reference current ISA are changed according to the control signals REG(0) to (3), and drive performance is adjusted according to the length of the data transfer distance.

Figure 13A:
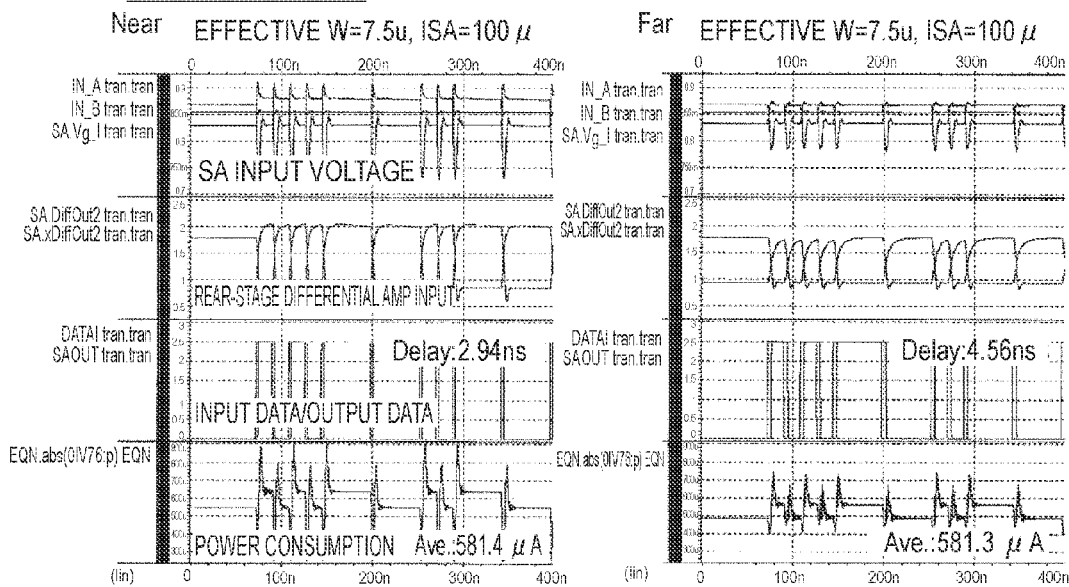
FIG. 13A and FIG. 13B are charts showing comparison of simulation results of transmission waveforms and delayed states in the circuit according to the embodiment and in a normal circuit.
Figure 13B:
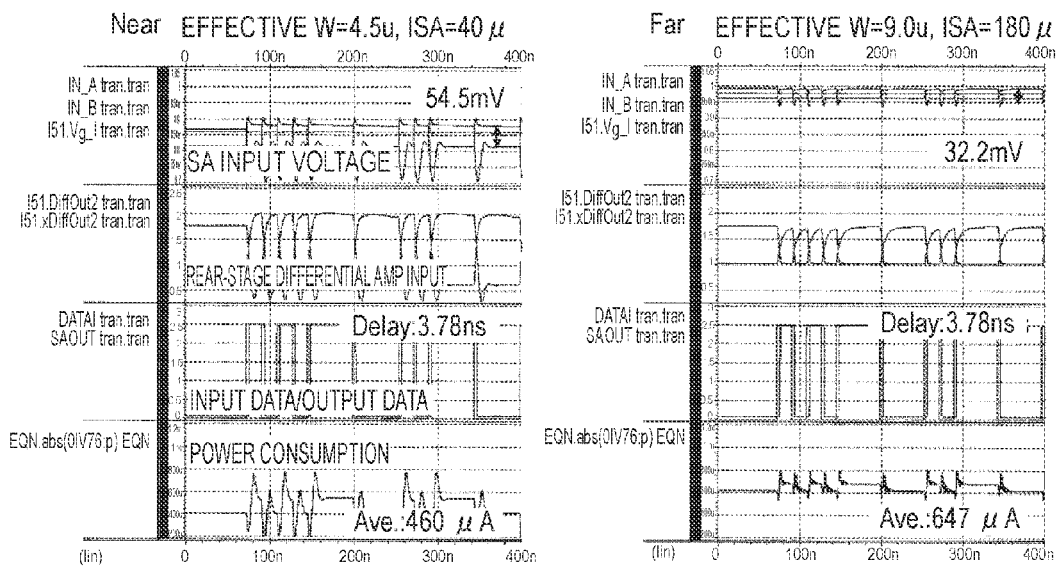

FIG. 13A and FIG. 13B are charts showing comparison of simulation results of transmission waveforms and delayed states in the circuit according to the embodiment and in a normal circuit. FIG. 13A shows transmission waveforms and delayed states in the normal circuit and FIG. 13B shows transmission waveforms and delayed states of the circuit of the embodiment.

FIG. 13A and FIG. 13B show transmission waveforms and delayed states at the near end and the far end, respectively.

In the case of the normal circuit, the effective gate width W of the transistor of the sense amplifier circuit is fixed to 7.4 µm, and a value of the reference current ISA is fixed to 100 µA both in the near and the far end.

In this case, the delay is 2.94 ns and the average current consumption is 581.4 µA in the near end. In the far end, the delay is 4.56 nm and the average current consumption is 581.3 µA.

In the case of the circuit according to the embodiment, the effective gate width W of the transistor of the sense amplifier circuit is set to 4.4 µm, and a value of the reference current ISA is fixed to 40 µA in the near end. On the other hand, the effective gate width W of the transistor of the sense amplifier circuit is fixed to 9.4 µm, and a value of the reference current ISA is set to 180 µA in the far end.

In this case, the delay is 3.78 ns and the average current consumption is 460 µA in the near end. In the far end, the delay is 3.78 ns and the average current consumption is 647 µA.

That is, in the circuit according to the embodiment, the sense amplifier control circuits 16, 180, and 180A performs control so that drive performance of the sense amplifier circuits receiving data at the far end becomes higher than the sense amplifier circuits receiving data at the near end.

As can be seen from FIG. 13A and FIG. 13B, the circuit according to the embodiment can reduce effects due to wiring delay on the transfer line as compared with the normal circuit as well as can reduce power consumption by delaying data transfer from the near end.

As described above, the solid-state imaging device 100 according to the embodiment has the following configuration.

The solid-state imaging device 100 includes the pixel array unit 110 in which plural pixels for performing photoelectric conversion are arranged in a matrix state and plural data transfer lines 154-0 to 154-m for transferring digital data.

The solid-state imaging device 100 also includes plural sense amplifier circuits 171-0 to 171-m connected to end portions of respective transfer lines, detecting and outputting data transferred through the transfer lines with drive performance in accordance with the control signal REG.

The solid-state imaging device 100 further includes plural counter latches 152-0 to 152-n arranged in parallel, which transfer latched data in response to selection signals to corresponding transfer lines, and the column scanning circuit 130 generating selection signals and outputting them to corresponding counter latches 152.

The solid-state imaging device 100 further includes the sense amplifier control circuit 180 generating the control signal REG for controlling drive performance of the sense amplifier circuits 171-0 to 171-m to adjust data transfer delay and outputting the control signal to the sense amplifier circuits 171-0 to 171-m.

The transfer lines 154-0 to 154-m are arranged in parallel to the arrangement direction of the counter latches 152-0 to 152-n, which are connected to corresponding sense amplifier circuits 171-0 to 171-m arranged in this direction.

The sense amplifier control circuit 180 generates the control signal REG for adjusting drive performance according to the length of the data transfer distance from the sense amplifier circuits 171-0 to 171-m on the transfer lines 154-0 to 154-m.

Thus, according to the embodiment, the following advantages can be obtained.

Specifically, it is possible to speed up data transfer from the far end as well as to respond to long wiring. This is advantageous for data transfer having the long H-size such as a large CMOS image sensor of the full size or an APS size.

That is, at the time of horizontal transfer of data at the imaging unit, a position-depending component due to the data transfer distance in skew components of data which have been obstacles for speeding up can be removed, which will contribute further speeding-up or enlargement to the image sensor.

Data transfer delay from the near end and far end can be made aligned, therefore, design for timing margin will be easy at the flip flop for taking data in a stage following the sense amplifier circuit, which can realize reduction of a design period and the number of processes.

The image sensor has narrow and uniform column width and a repeater circuit inserted in the middle of wiring is irregular. In the embodiment, it is possible to speed up data transfer without inserting the repeater in the wiring, which will be advantageous in the image sensor.

The data transfer delay from the near end is delayed, thereby reducing power consumption.

The solid-state imaging device having the above advantages can be applied as an imaging device for a digital camera, a video camera and so on.

3. Third Embodiment

Figure 14:
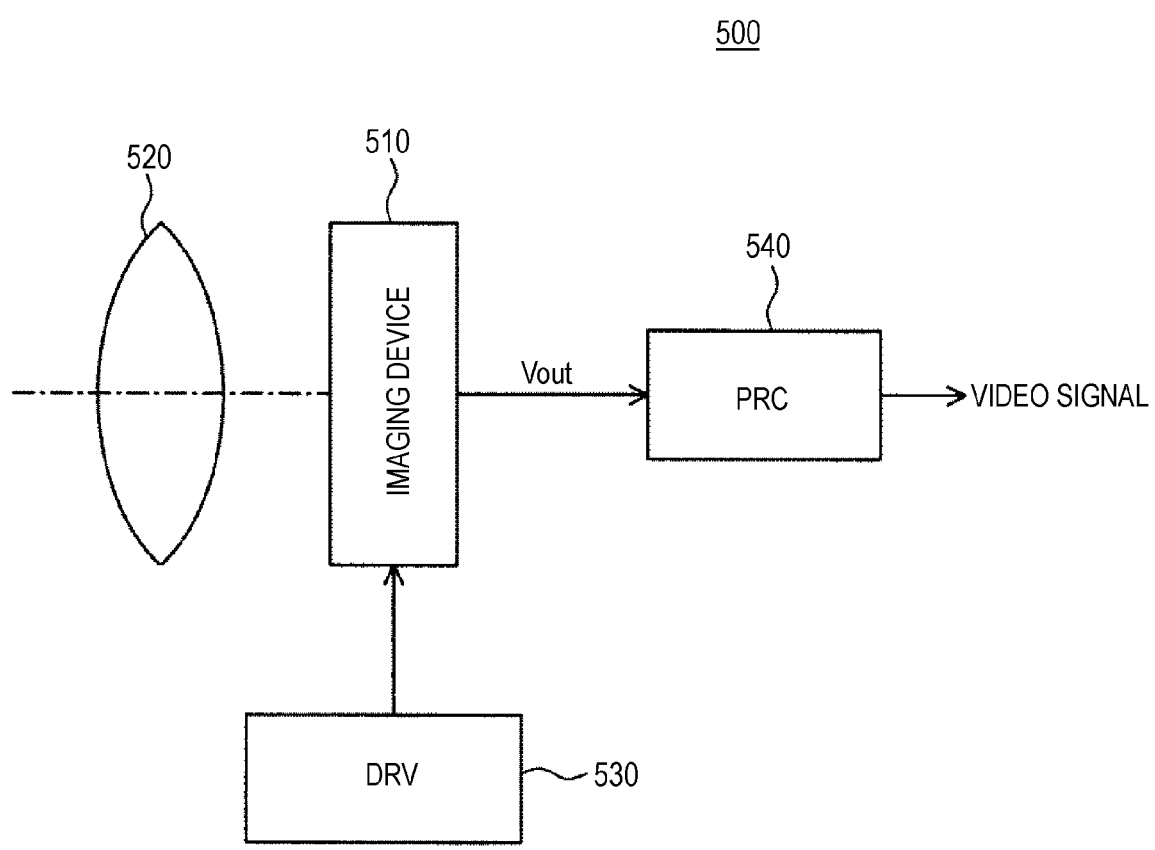
FIG. 14 is a view showing a configuration example of a camera system to which a solid-state imaging device according to an embodiment of the invention is applied.

FIG. 14 is a view showing a configuration example of a camera system to which a solid-state imaging device according to a third embodiment is applied.

As shown in FIG. 14, a camera system 500 includes an imaging device 510 to which the solid-state imaging device 100 according to the embodiment can be applied.

The camera system 500 includes an optical system introducing incident light (recoding a subject image) to a pixel region of the imaging device 510, for example, an optical system (lens) 520 for imaging incident light (image light) on an imaging surface.

The camera system 500 further includes a drive circuit (DRV) 530 for driving the imaging device 510 and a signal processing circuit (PRC) 540 for processing an output signal of the imaging device 510.

The drive circuit 530 includes a timing generator (not shown) for generating various timing signals including start pulses and clock pulses driving the circuits in the imaging device 510, and drives the imaging device 510 by a given timing signal.

The signal processing circuit 540 performs given signal processing to an output signal from the imaging device 510.

An image signal processed in the signal processing circuit 540 is recorded in a recording medium such as a memory. The image information recorded in the recording medium is hard copied by a printer and the like. The image signal processed in the signal processing circuit 540 is reproduced on a monitor formed by a liquid crystal display and the like as moving pictures.

As described above, the above-described solid-state imaging device 100 is mounted on the imaging apparatus such as a digital still camera as the imaging device 510, thereby realizing a high precision camera.

The present application contains subject matter related to that disclosed in Japanese Priority Patent Application JP 2009-008254 filed in the Japan Patent Office on Jan. 16, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A data transfer circuit comprising:
plural transfer lines operable to transfer data;
plural data output units each connected to an end portion of a respective transfer line, the plural data output units operable to detect and output data transferred through the transfer lines with drive performance based on a control signal;
plural data transmission units arranged in parallel and operable to transfer data to one or more of the transfer lines in response to selection signals;
a selection control unit operable to generate selection signals and output the selection signals to the corresponding data transmission units; and
a control unit operable to (i) generate the control signal to control drive performance of the data output units and adjust data transfer delay, and (ii) output the control signal to the respective output units,
wherein,
the transfer lines are arranged in the arrangement direction parallel to the data transmission units and connected to the corresponding data output units arranged in the direction,
the control unit is operable to generate the control signal to adjust the drive performance based on a length of the data transfer distance from the data transmission units to the data output units on the transfer lines,
each data output unit includes (i) an amplification unit operable to amplify input data transferred through the data transfer line, and (ii) a feedback unit operable to feed back data amplified at the amplification unit to the transfer line, the feedback unit operable to feed back the amplified data to the transfer line by a feedback amount in accordance with the control signal.

2. The data transfer circuit according to claim 1, wherein the control unit generates the control signal so that the drive performance is increased in proportion as the data transfer distance from the data transmission units to the data output units on the transfer lines increases.

3. A data transfer circuit comprising:
plural transfer lines operable to transfer data;
plural data output units each connected to an end portion of a respective transfer line, the plural data output units operable to detect and output data transferred through the transfer lines with drive performance based on a control signal;
plural data transmission units arranged in parallel and operable to transfer data to one or more of the transfer lines in response to selection signals;
a selection control unit operable to generate selection signals and output the selection signals to the corresponding data transmission units; and
a control unit operable to (i) generate the control signal to control drive performance of the data output units and adjust data transfer delay, and (ii) output the control signal to the respective output units,
wherein,
the transfer lines are arranged in the arrangement direction parallel to the data transmission units and connected to the corresponding data output units arranged in the direction,
the control unit is operable to generate the control signal to adjust the drive performance based on a length of the data transfer distance from the data transmission units to the data output units on the transfer lines,
each data output unit includes (i) a threshold voltage generating unit operable to generate a threshold voltage based on a reference current which can be adjusted in accordance with the control signal, (ii) an amplification unit operable to amplify input data by comparing input data transferred through the transfer line with the threshold voltage, and (iii) a unit operable to feed back the amplified data at the amplification unit to the transfer line, the threshold voltage generating unit operable to generate the threshold voltage by a reference current amount based on the control signal, and the feedback unit operable to feed back the amplified data to the transfer line by a feedback amount based on the control signal.

4. The data transfer circuit according to claim 3, wherein, the threshold voltage generating unit includes plural current amounts operable to select one or plural current sources by the control signal, and the feedback unit includes plural transistors having different driving performances operable to select one or plural transistors relating feedback by the control signal.

5. The data transfer circuit according to claim 4, wherein the control unit is operable to (i) determine a number for adjusting feedback amount based on wiring length of the transfer line, and (ii) generate the control signal as a signal to control the feedback amount by changing steps based on a position of a holding unit, the holding unit operable to read data to the transfer line.

* * * * *